US012576763B2

(12) United States Patent
Xiao et al.

(10) Patent No.: US 12,576,763 B2
(45) Date of Patent: Mar. 17, 2026

(54) ADJUSTMENT ASSEMBLY AND HEADREST

(71) Applicant: Southco Manufacturing and Technology (Shanghai) Co., Ltd., Shanghai (CN)

(72) Inventors: Huaxian Xiao, Shanghai (CN); Leo Lian, Shanghai (CN); Pei Yang, Shanghai (CN)

(73) Assignee: Southco Manufacturing and Technology (Shanghai) Co., Ltd., Shanghai (CN)

( * ) Notice: Subject to any disclaimer, the term of this patent is extended or adjusted under 35 U.S.C. 154(b) by 328 days.

(21) Appl. No.: 18/108,346

(22) Filed: Feb. 10, 2023

(65) Prior Publication Data

US 2024/0075861 A1      Mar. 7, 2024

(30) Foreign Application Priority Data

Sep. 5, 2022    (CN) .......................... 202211078452.2

(51) Int. Cl.
B60N 2/829 (2018.01)
B60N 2/865 (2018.01)
(Continued)

(52) U.S. Cl.
CPC ............. B60N 2/829 (2018.02); B60N 2/865 (2018.02); A47C 7/38 (2013.01); B60N 2/853 (2018.02); B60N 2/868 (2018.02)

(58) Field of Classification Search
CPC ........ B60N 2/829; B60N 2/865; B60N 2/853; B60N 2/868; A47C 7/38
See application file for complete search history.

(56) References Cited

U.S. PATENT DOCUMENTS 10,414,312 B2 *   9/2019   Fredriksson ........... B60N 2/829
2011/0089737 A1 *   4/2011   Tscherbner ............ B60N 2/812
                                                          297/391

(Continued)

FOREIGN PATENT DOCUMENTS

JP          H02-061233 U      5/1990
JP          2017-178096 A    10/2017
KR      10-2022-0060870 A    5/2022

OTHER PUBLICATIONS

Office Action with translation issued Nov. 7, 2023, by the Japan Patent Office in corresponding Japanese Patent Application No. 2022-176437. (10 pages).

*Primary Examiner* — Syed A Islam
(74) *Attorney, Agent, or Firm* — Buchanan Ingersoll & Rooney PC

(57)          ABSTRACT

The present application discloses an adjustment assembly and a headrest. The adjustment assembly includes: a guiding rod; a fixing member, fixed to an end of the guiding rod; a driving portion, movably connected to the fixing member; and a first screw, engaged to the fixing member with threads, and the driving portion is connected to the fixing member by the first screw, wherein the driving portion includes a first motor, and the first motor is used to drive the driving portion to linearly move in respect to the fixing member along a direction close to or away from the fixing member. The adjustment assembly of the application can be adjusted electrically, such that the operation is convenient, and the structure is simple and reliable.

14 Claims, 26 Drawing Sheets

(51) Int. Cl.

| | |
|---|---|
| *A47C 7/38* | (2006.01) |
| *B60N 2/853* | (2018.01) |
| *B60N 2/868* | (2018.01) |

(56) References Cited

U.S. PATENT DOCUMENTS

| | | | |
|---|---|---|---|
| 2018/0029510 A1 | 2/2018 | Little | |
| 2018/0334061 A1 | 11/2018 | Fredriksson | |
| 2019/0160985 A1* | 5/2019 | Yu ........................... | B60N 2/829 |
| 2019/0168649 A1* | 6/2019 | Watson ................. | B60N 2/829 |
| 2019/0315256 A1 | 10/2019 | Maloney et al. | |
| 2023/0202369 A1* | 6/2023 | Kim ....................... | B60N 2/885 |
| | | | 297/391 |

* cited by examiner

40

442

441

440

411

410

433

4312

4312

4311

4311

420

423

421

422

420

421

422

423

432

432

439

439

435

436

437

437

ADJUSTMENT ASSEMBLY AND HEADREST

CROSS REFERENCE TO RELATED APPLICATION

This application claims priority to Chinese Patent Application No. 202211078452.2, entitled "ADJUSTMENT ASSEMBLY AND HEADREST", filed on Sep. 5, 2022, the entire content of which is incorporated herein by reference.

TECHNICAL FIELD

The present application relates to an adjustment assembly, and particularly to an electric adjustment assembly. The application also relates to a headrest comprising the adjustment assembly.

BACKGROUND

The seat of a vehicle usually has a headrest for supporting the head of a passenger, thereby improving comfort of the seat. Traditional headrests generally can be manually adjusted up and down, so as to accommodate passengers of different heights.

However, the technical function of the electric adjustment of the headrest in the prior art is relatively single, and needs to be further optimized.

Therefore, an adjustment assembly and a headrest which are easy in operation, simple and reliable in structure are required.

SUMMARY

An object of the application is to provide an adjustment assembly which can be adjusted electrically.

An object of the application is to provide an adjustment assembly which can be electrically adjusted in two directions perpendicular to each other, respectively.

Furthermore, an object of the application is to provide an adjustment assembly which can overcome at least one of the above-mentioned drawbacks.

In order to achieve the above objects, the application provides an adjustment assembly, which includes: a guiding rod; a fixing member, fixed to an end of the guiding rod; a driving portion, movably connected to the fixing member; and a first screw, engaged to the fixing member with threads, and the driving portion is connected to the fixing member by the first screw, wherein the driving portion includes a first motor, and the first motor is used to drive the driving portion to linearly move in respect to the fixing member along a direction close to or away from the fixing member.

In an embodiment, the adjustment assembly includes two guiding rods extending parallel to each other, the fixing member includes a fixing rod, and the fixing member is fixed between the two guiding rods by the fixing rod.

In an embodiment, the driving portion further includes a first gear and a driving portion casing, the first motor and the first gear are arranged in the driving portion casing, and the first motor is engaged with the first screw by the first gear.

In an embodiment, the adjustment assembly further comprises a second screw, the driving portion further includes a second motor and a second gear, the second motor and the second gear are arranged in the driving portion casing, the second motor is engaged with the second screw by the second gear, and the second motor is used to drive the second screw to linearly move along an axis direction of the second screw.

In an embodiment, the first screw is perpendicular to the second screw, and the first screw extends in a vertical direction.

In an embodiment, the first motor is located below the second motor, and an output shaft of the first motor is parallel to an output shaft of the second motor.

In an embodiment, the adjustment assembly further comprises a slider slidably disposed on the guiding rod, the driving portion is fixed to the slider, and the driving portion is centrally arranged in a direction perpendicular to a sliding direction of the slider.

In an embodiment, the adjustment assembly further comprises a slider, the slider includes a first sliding portion, a second sliding portion, and a connecting portion connecting the first sliding portion and the second sliding portion, the first sliding portion and the second sliding portion are respectively slidably disposed on the two guiding rods, and the driving portion is fixed to the slider between the first sliding portion and the second sliding portion.

In an embodiment, the first gear and the second gear each includes at least two gears.

In an embodiment, the first motor and the second motor respectively includes a Hall sensor for position memory.

In an embodiment, the first screw can be locked in respect to the fixing member at any position of its movement, and the second screw can be locked in respect to the second motor at any position of its movement.

In an embodiment, the guiding rod includes a bent portion and a positioning portion, the bent portion forms an angle in respect to other portions of the guiding rod to limit a movement range of the slider, the positioning portion is formed as a plurality of grooves extending along a length of the guiding rod for providing resistance to a movement of the slider at a plurality of positions.

In another aspect, the application provides a headrest, which comprises: the above mentioned adjustment assembly; an outer shell, forming an appearance of the headrest; and an inner shell, disposed inside the outer shell and fixed to the outer shell, and surrounding at least a portion of the adjustment assembly, wherein the outer shell and the inner shell move together with the driving portion of the adjustment assembly.

In an embodiment, the outer shell is provided with a wiring hole, and the wiring hole is used for passing of a wire harness.

In a further aspect, the application provides a headrest, which comprises: the above mentioned adjustment assembly; an outer shell, forming an appearance of the headrest; and an inner shell, disposed inside the outer shell and fixed to the outer shell, and surrounding at least a portion of the adjustment assembly, wherein the outer shell and the inner shell move in a first direction together with a driving portion of the adjustment assembly, and the second screw abuts against the inner shell, such that the outer shell and the inner shell move in a second direction together with the second screw in respect to the driving portion casing.

In an embodiment, the first direction is perpendicular to the second direction.

In an embodiment, the outer shell is provided with a wiring hole, and the wiring hole is used for passing of a wire harness.

The adjustment assembly of the application can be adjusted electrically, such that the operation is convenient, and the structure is simple and reliable.

The adjustment assembly of the application can adjust the position in two dimensions, so as to match the stature and needs of a passenger better.

BRIEF DESCRIPTION OF THE DRAWINGS

Various objects, features and advantages of the present application will become more apparent, the application by considering the following detailed description of preferred embodiments of the application in conjunction with the accompanying drawings. The drawings are merely exemplary illustrations of the application and are not necessarily drawn to scale. Throughout the drawings, same reference numbers refer to the same or like parts. Moreover, in the drawings.

DETAILED DESCRIPTION

Figure 1:
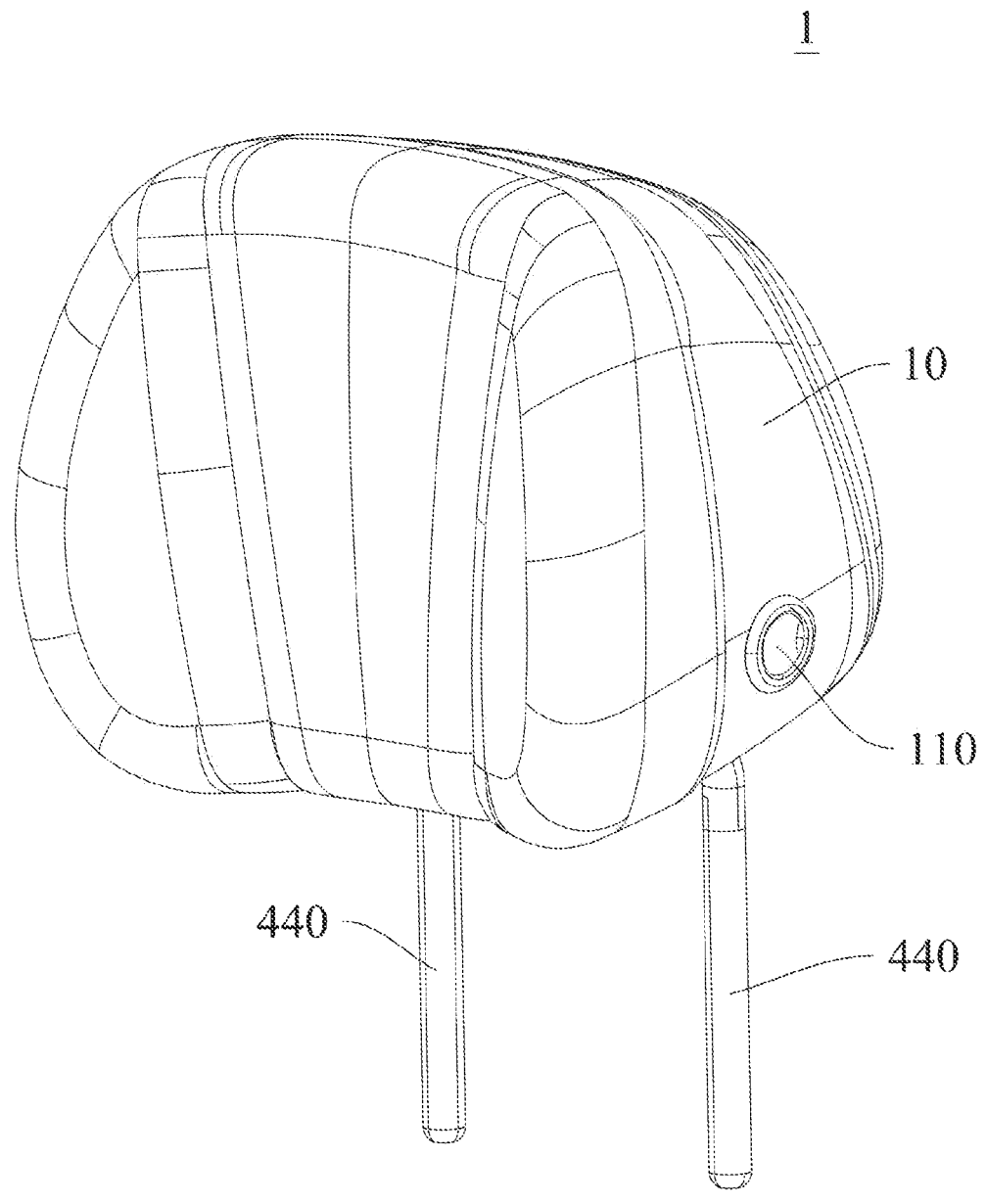
FIG. 1 is a perspective view of a headrest of the application.

In order to further illustrate principle and structure of the present application, preferred embodiments of the application will now be described in detail in conjunction with the accompanying drawings. However, the embodiments are only used for illustration and explanation, and cannot be used to limit the patent protection scope of the application.

The terms in this application are only used for the purpose of describing particular embodiments and are not intended to limit the application. As used in this application and the appended claims, the singular forms "a," "an," "the" and "the" are intended to include the plural forms as well, unless the context clearly dictates otherwise. Further, it will also be understood, the term "and/or" as used herein refers to and includes any and all possible combinations of one or more of the associated listed items.

The headrest 1 of the application can be applied to a seat of a vehicle, for example, a seat of a car. Alternatively, the headrest 1 of the application can also be applied to a seat other than a vehicle.

Referring to FIGS. 1-7, in an embodiment, the headrest 1 may include: an adjustment assembly 40; an outer shell 10 forming an appearance of the headrest 1; and an inner shell 20 disposed inside the outer shell 10 and fixed to the outer shell 10 and surrounds at least a portion of the adjustment assembly 40. The outer shell 10 and the inner shell 20 move in a first direction together with a driving portion 430 of the adjustment assembly 40 (to be described in detail below), and a second screw 435 (to be described in detail below) abuts against the inner shell 20, such that the outer shell 10 and the inner shell 20 move in a second direction together with the second screw 435 in respect to a driving portion casing 431 (to be described in detail below). The first direction and the second direction may be perpendicular to each other.

Figure 2:
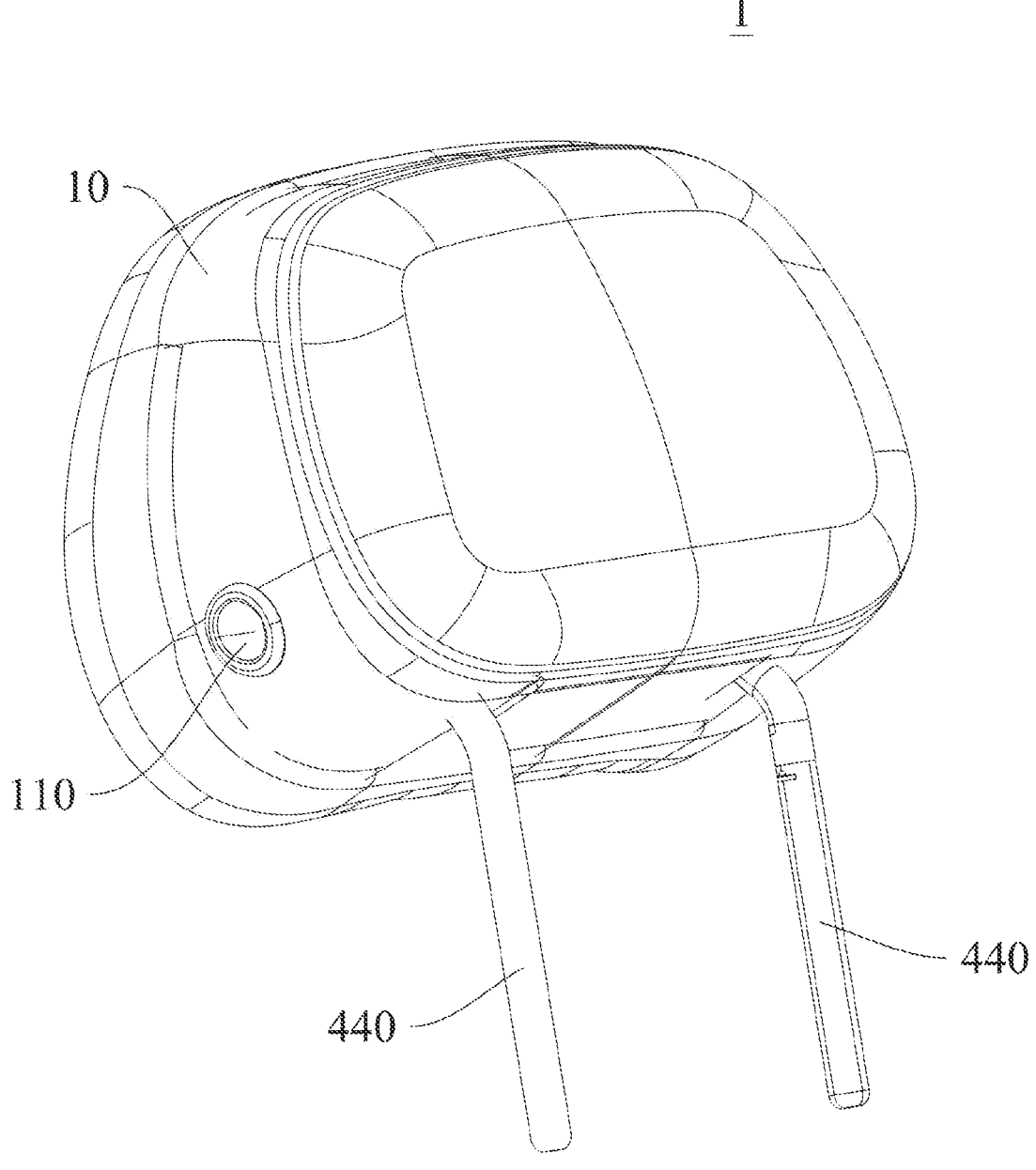
FIG. 2 is a perspective view of the headrest of the application from another angle of view.
Figure 7:
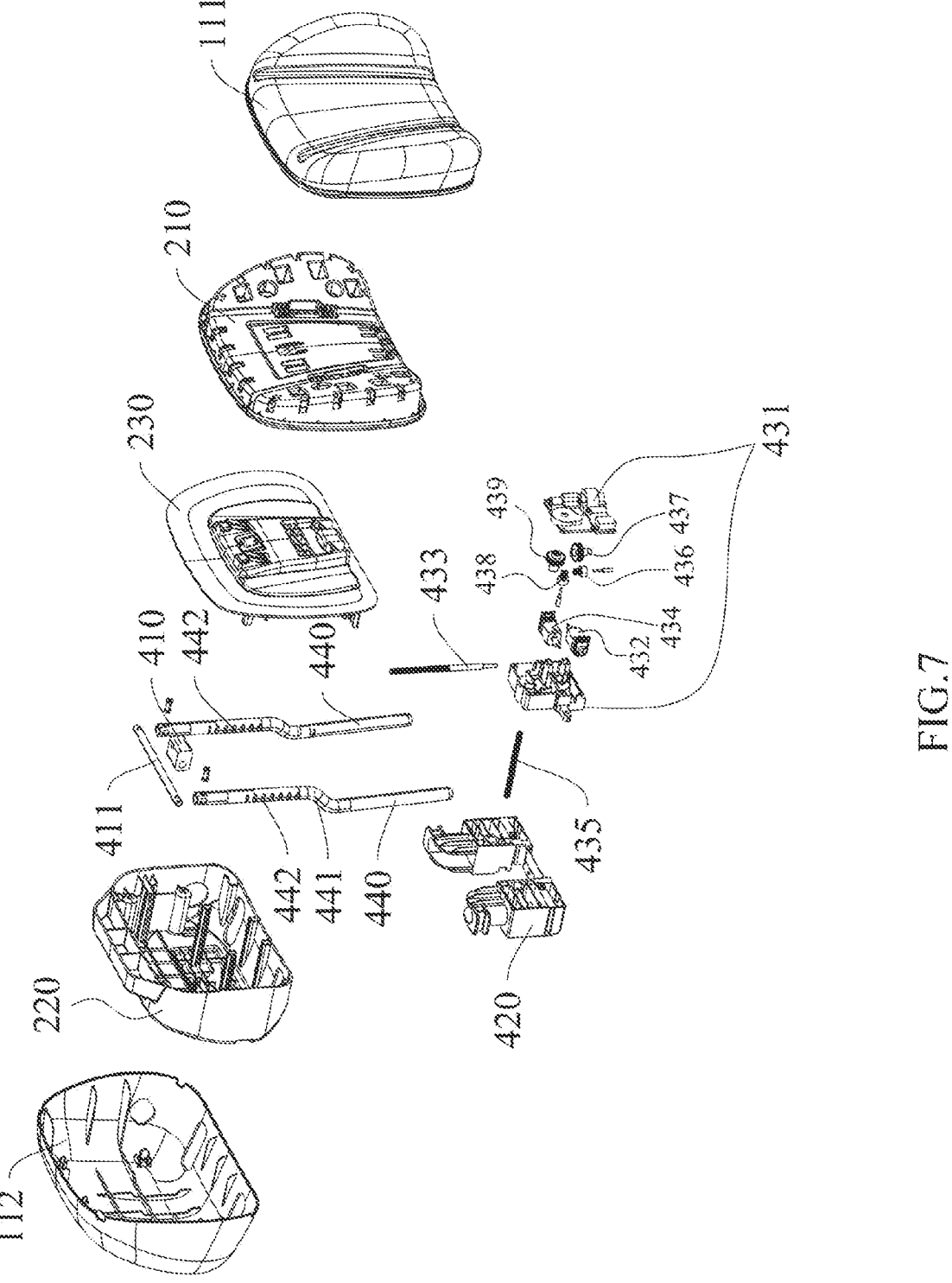
FIG. 7 is an exploded perspective view of the headrest of the application.

Referring to FIGS. 1-2 and 7, the outer shell 10 may include an outer shell front portion 111 and an outer shell rear portion 112. The outer shell front portion 111 and the outer shell rear portion 112 may be fixed to each other and enclose a certain space. At least a portion of a surface of the outer shell 10 (e.g., the outer shell front portion 111) may be made of a soft material, so as to provide a good touch feeling. The outer shell 10 may further include a wiring hole 110. The wiring hole 110, for example, may be used for passing of a wire harness, and the wire harness may be used for supplying power to elements in the outer shell 10 or controlling the elements in the outer shell 10. The application does not limit position of the wiring hole 110. The wire harness may extend from interior of the outer shell 10 through the wiring hole 110 to be connected to exterior of the outer shell 10, such that the elements inside the outer shell 10 can be controlled from outside. The headrest 1 may also be controlled wirelessly by a further remote control.

Figure 3:
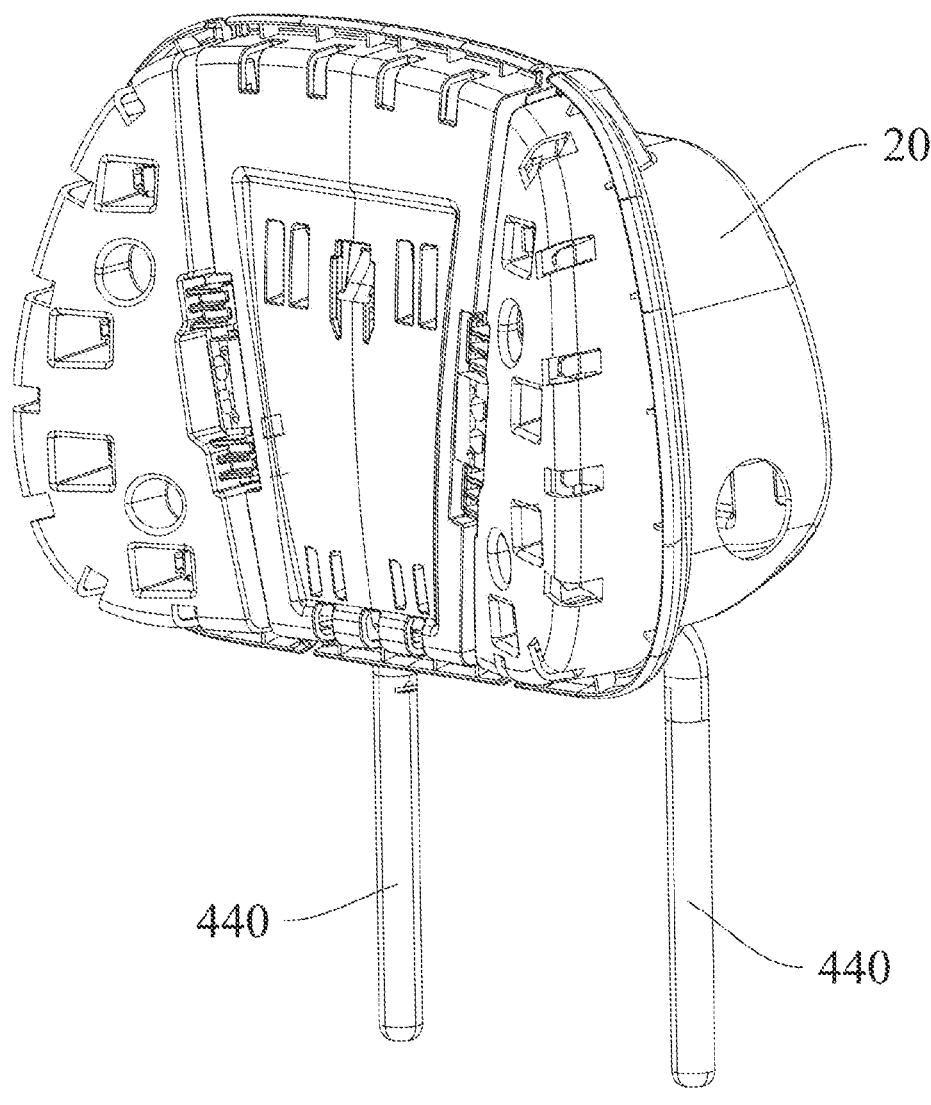
FIG. 3 is a perspective view of the headrest of the application with an outer shell of the headrest removed.
Figure 4:
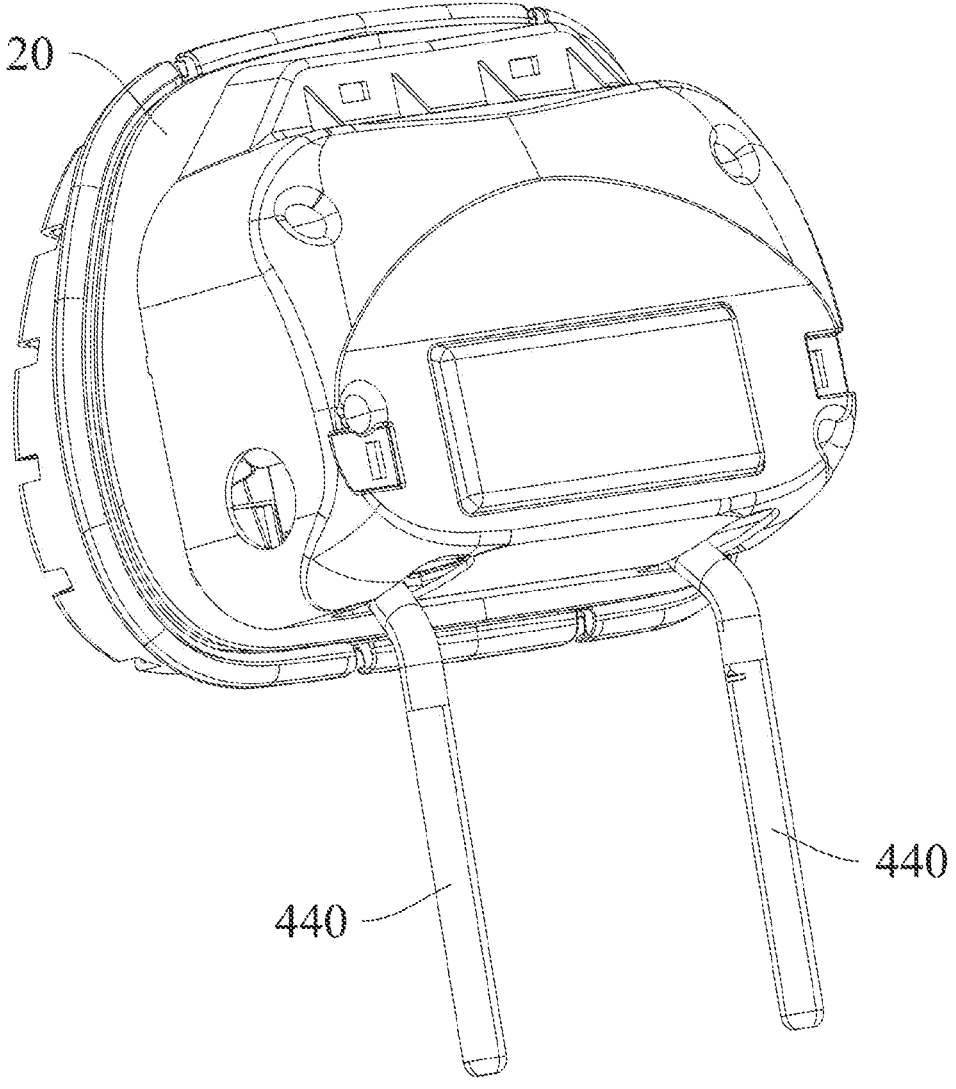
FIG. 4 is a perspective view of the headrest of the application from another angle of view with the outer shell of the headrest removed.

Referring to FIGS. 3-4 and 7, the inner shell 20 may include a deformable shell body 210, an inner shell rear portion 220, and an inner shell front portion 230. The inner shell front portion 230 and the inner shell rear portion 220 may be fixed to each other and enclose a certain space. The deformable shell body 210 may be fixed to the inner shell front portion 230. Specifically, a middle portion of the deformable shell body 210 is fixed to the inner shell front portion 230, and both sides of the deformable shell body 210 can be bent in respect to the middle portion of the deformable shell body 210, so as to realize two adjustable side wings. Since the two side wings can be bent in respect to the middle portion of the deformable shell body 210, transverse support forces at different angles can be provided to the passenger's head. The outer shell front portion 111 may have a structure corresponding to the deformable shell body 210. That is, both sides of the outer shell front portion 111 can be bent together with the two sides of the deformable shell body 210. Surface of the inner shell 20 may be made of a hard material, such as plastic or metal, so as to provide structural strength to the headrest 1. Alternatively, the inner shell 20 may not include the deformable shell body 210.

Figure 5:
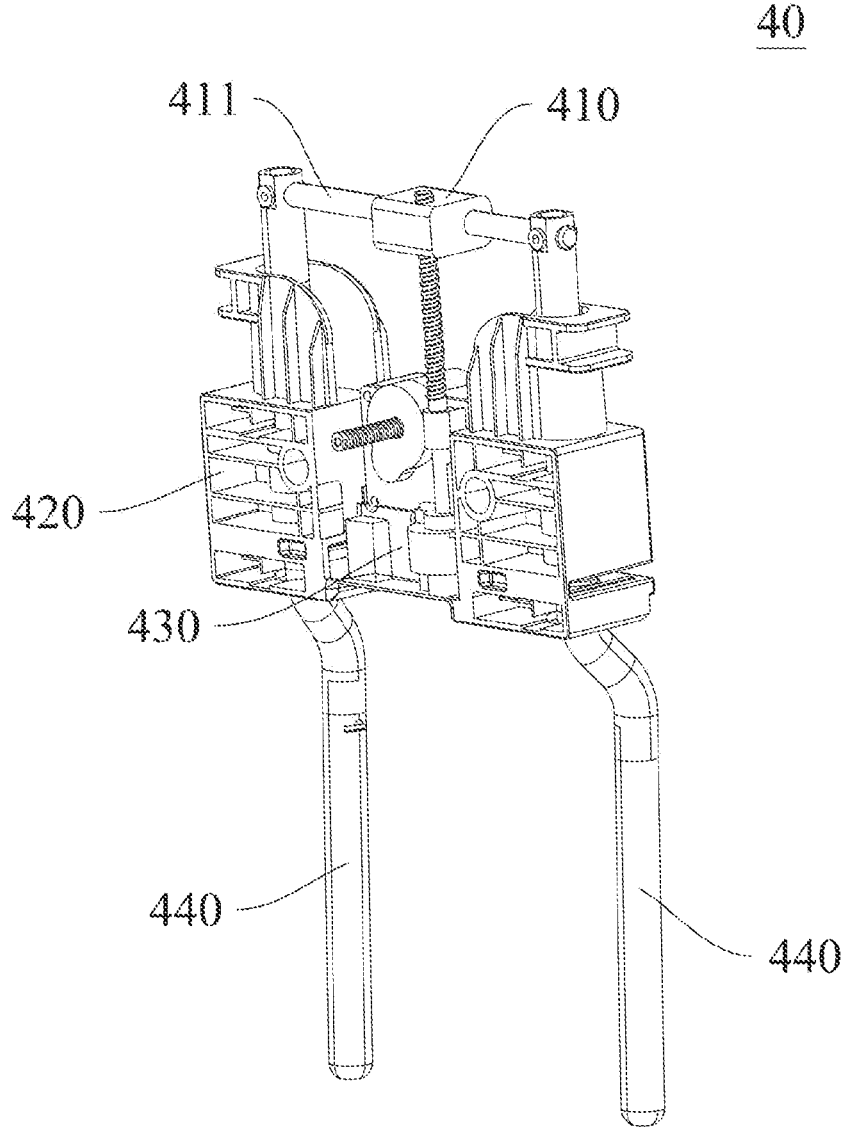
FIG. 5 is a perspective view of an adjustment assembly of the application.
Figure 6:
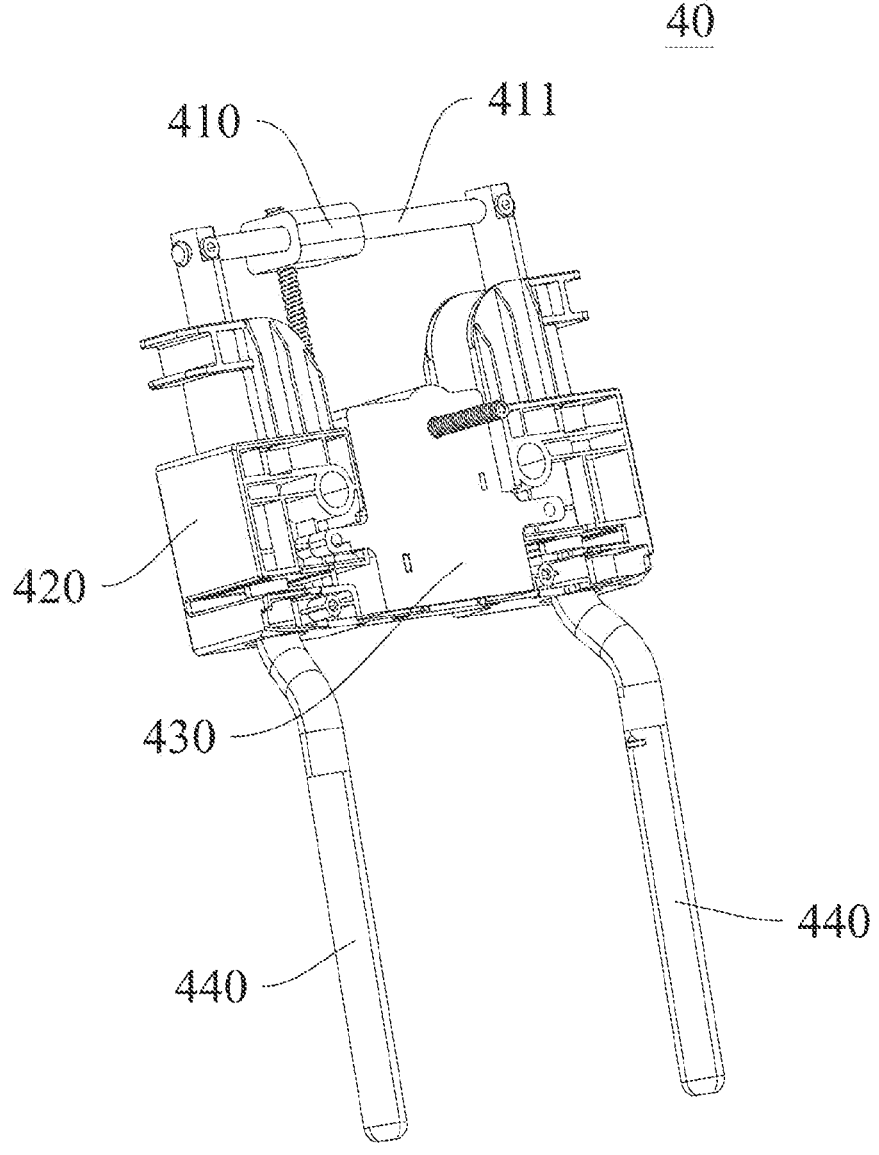
FIG. 6 is a perspective view of the adjustment assembly of the application from another angle of view.

Referring to FIGS. 5-7, the adjustment assembly 40 may include: guiding rods 440; a fixing member 410 fixed to an end of guiding rod 440; and a driving portion 430 movably connected to the fixing member 410. The driving portion 430 may include a first motor 432. The first motor 432 is used to drive the driving portion 430 in respect to the fixing member 410 in a direction close to or away from the fixing member 410.

The guiding rods 440 may be formed of a metal (e.g., steel). The adjustment assembly 40 may include two guiding rods 440. The two guiding rods 440 may extend parallel to each other. As shown in FIGS. 1-4, a part of each guiding rod 440 may be located inside the outer shell 10 and the inner shell 20, and other parts of each guiding rod 440 may extend out of the outer shell 10 and the inner shell 20. The parts of each guiding rod 440 extending out of the outer shell 10 and the inner shell 20 may be inserted into a backrest (not shown) of a car seat, thereby securing the headrest 1 to the backrest of the car seat. Alternatively, the adjustment assembly 40 may include one guiding rod 440 or more than two guiding rods 440.

Figure 8:
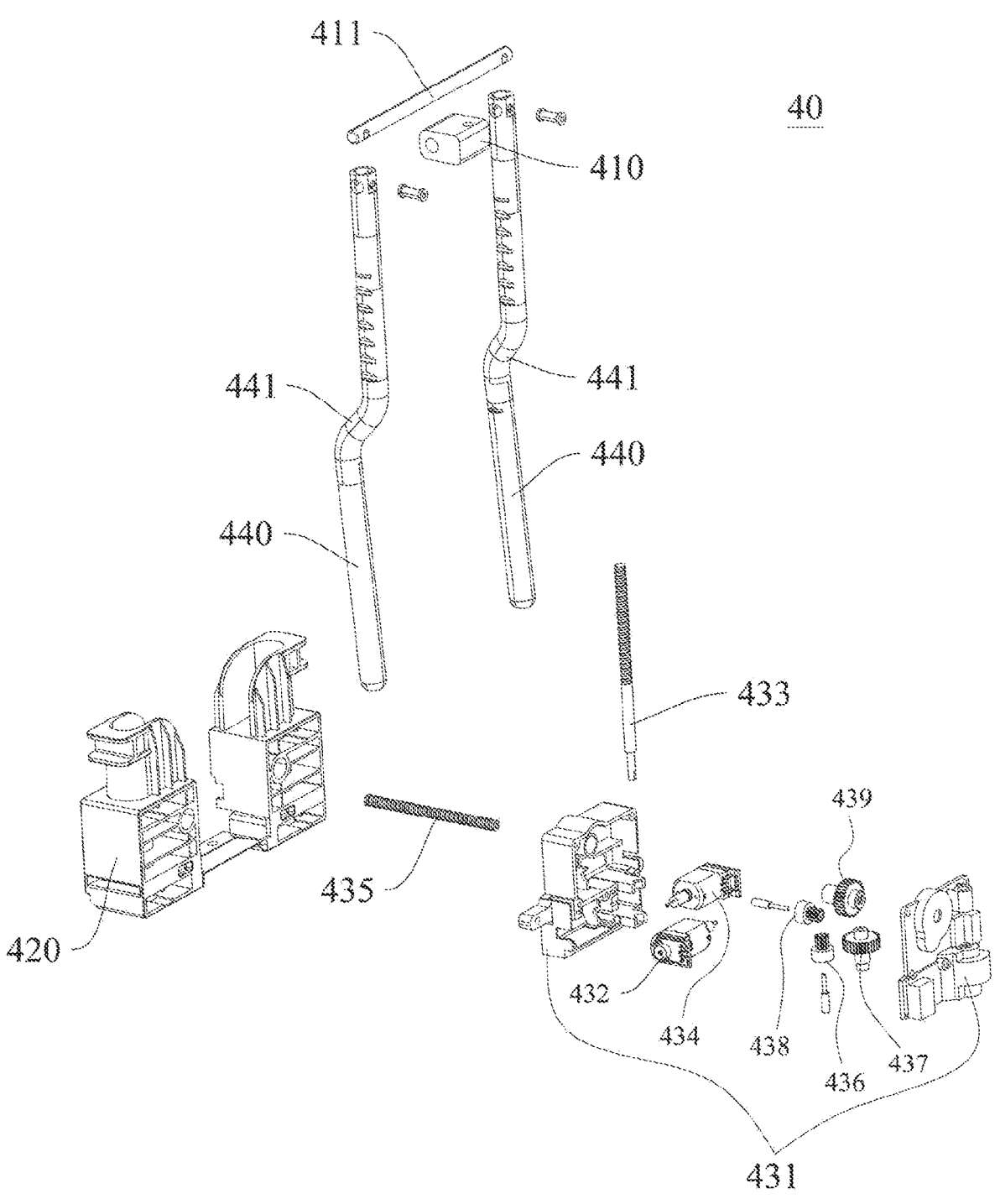
FIG. 8 is an exploded perspective view of the adjustment assembly of the application.
Figure 9:
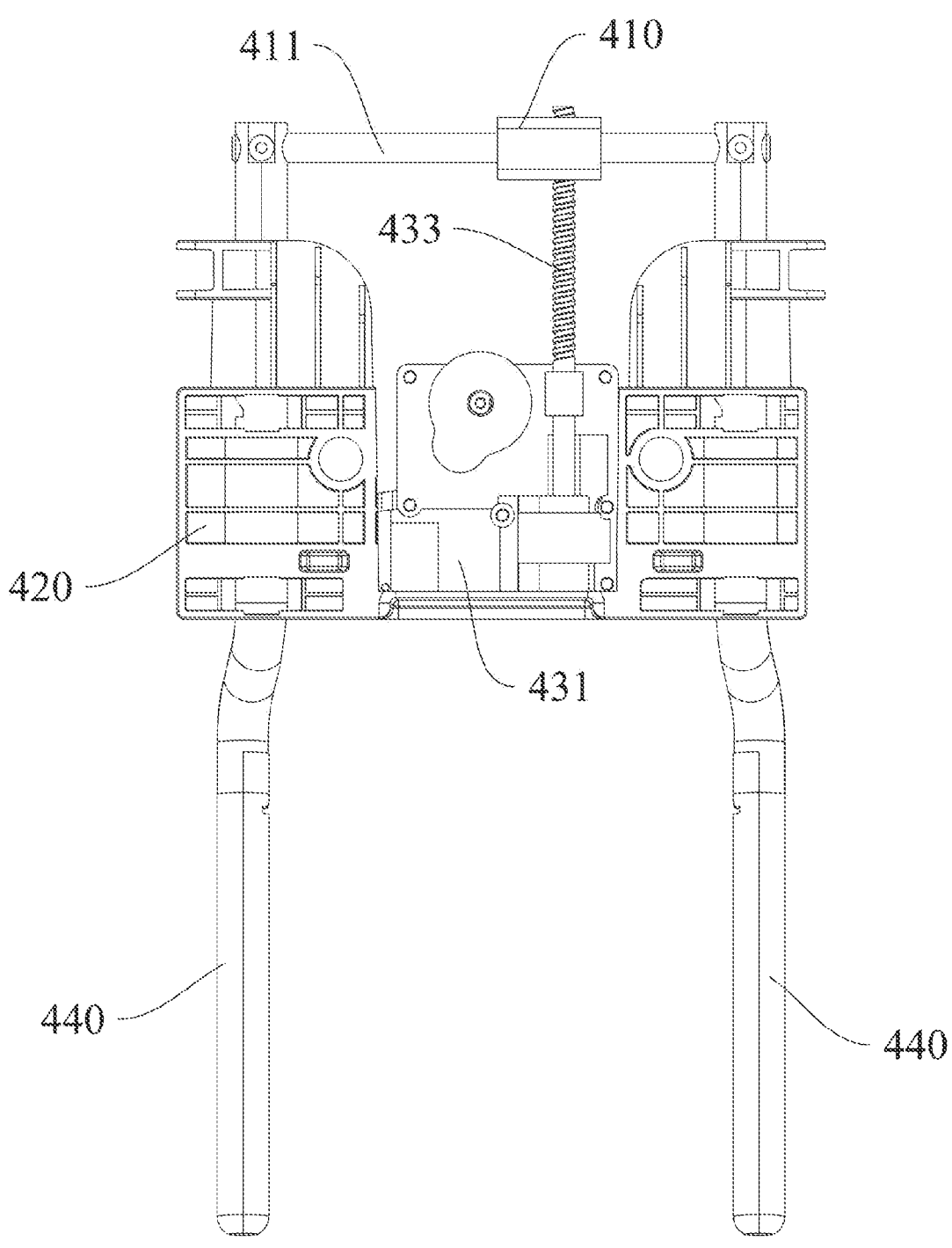
FIG. 9 is a front view of the adjustment assembly of the application.
Figure 10:
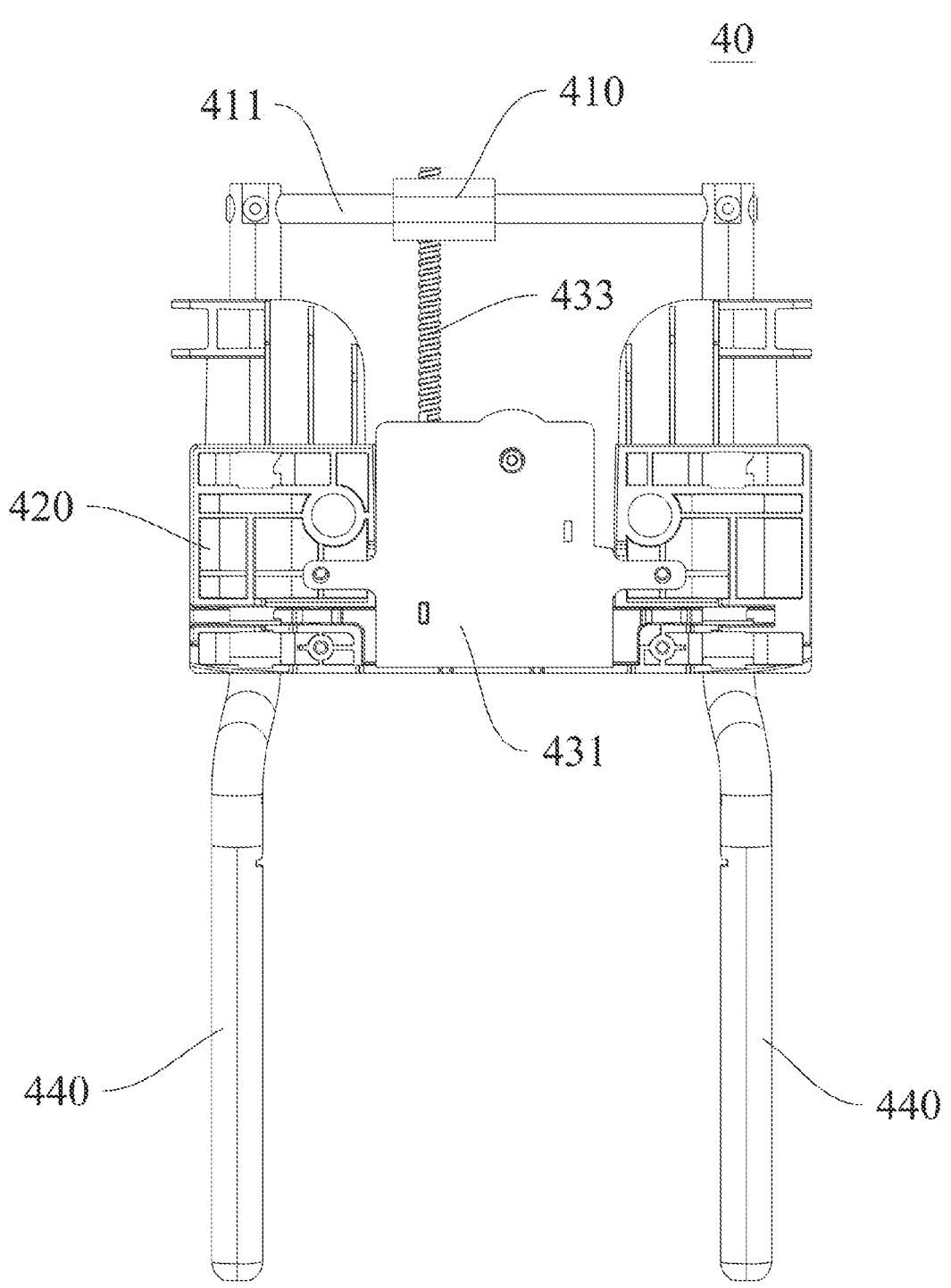
FIG. 10 is a rear view of the adjustment assembly of the application.
Figure 15:
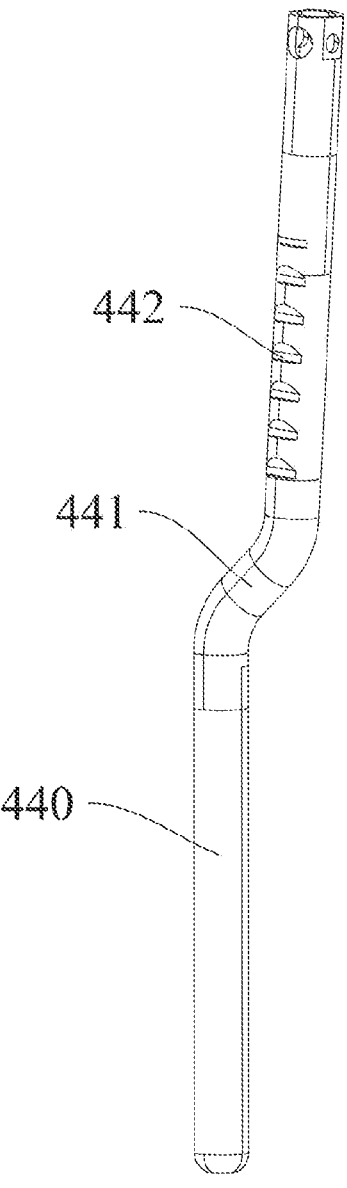
FIG. 15 is a perspective view of a guiding rod of the adjustment assembly of the application.

As shown in FIGS. 8 and 15, each of the guiding rods 440 may have a bent portion 441. The bent portion 441 may be disposed in middle of the guiding rod 440. Each of the guiding rod 440 may have a positioning portion 442 above the bent portion 441. The bent portion 441 may form an angle in respect to other parts of the guiding rod 440. The positioning portion 442 may be formed as a plurality of grooves or notches extending along a length of the guiding rod 440 for providing resistance to a movement of the slider 420 at a plurality of positions, or preventing the movement of the slider 420.

Referring to FIGS. 9-14 and 16-17, the fixing member 410 may be a block. The fixing rod 411 may transversely pass through the fixing member 410, and two ends of the fixing rod 411 are respectively fixed to upper ends of the two guiding rods 440. That is, the fixing member 410 is fixed between the two guiding rods 440 by the fixing rod 411. The adjustment assembly 40 may also include a first screw 433. The driving portion 430 may be connected to the fixing member 410 by the first screw 433. Specifically, the first screw 433 may be connected to the fixing member 410 with threads. More specifically, a threaded hole having an internal thread may be formed in the fixing member 410, the first screw 433 passes through the threaded hole, and an external thread of the first screw 433 is engaged with the internal thread of the threaded hole.

Referring to FIG. 7-14, the driving portion 430 may include a driving portion casing 431, a first motor 432, a first screw 433, a second motor 434, and a second screw 435. A lower end of the first screw 433 is inserted into the interior of the driving portion 430 and fixed to the driving portion casing 431.

Referring to FIGS. 19-22, the driving portion casing 431 may include a driving portion front casing 4311 and a driving portion rear casing 4312. The driving portion front casing 4311 and the driving portion rear casing 4312 may be fixed to each other and enclose a certain space. It should be understood, the application does not limit number of components of the driving portion casing 431 and the outer shell 10 and the inner shell 20 of the headrest 1 and combination of the respective components.

The first motor 432 and the second motor 434 may be accommodated and fixed in the driving portion casing 431. The first motor 432 may be located below the second motor 434. Alternatively, the second motor 434 may be located below the first motor 432. The first motor 432 is engaged with the first screw 433, and the second motor 434 is engaged with the second screw 435. Specifically, output shafts of the first motor 432 and the second motor 434 may be formed as worms, the output shaft of the first motor 432 may be engaged with the first screw 433 by two first gears 436, 437, and the output shaft of the second motor 434 may be engaged with the second screw 435 by two second gears 438, 439 (see FIGS. 27-32). The output shaft of the first motor 432 and the output shaft of the second motor 434 may be parallel to each other. The first gear 436 may be a double gear or a worm gear, which respectively meshes with the output shaft of the first motor 432 and the other first gear 437. The other first gear 437 is sleeved on the first screw 433. Similarly, the second gear 438 may be a double gear or a worm gear, which respectively meshes with the output shaft of the second motor 434 and the other second gear 439. The other second gear 439 is sleeved on the second screw 435. The application does not limit form and number of the first gears and the second gears. The first motor 432 and the first screw 433 may be engaged in other ways, as long as the power of the first motor 432 can be converted into rotation of the first screw 433. Likewise, the second motor 434 and the second screw 435 may be engaged in other ways, as long as the power of the second motor 434 can be converted into rotation of the second screw 435.

Figure 11:
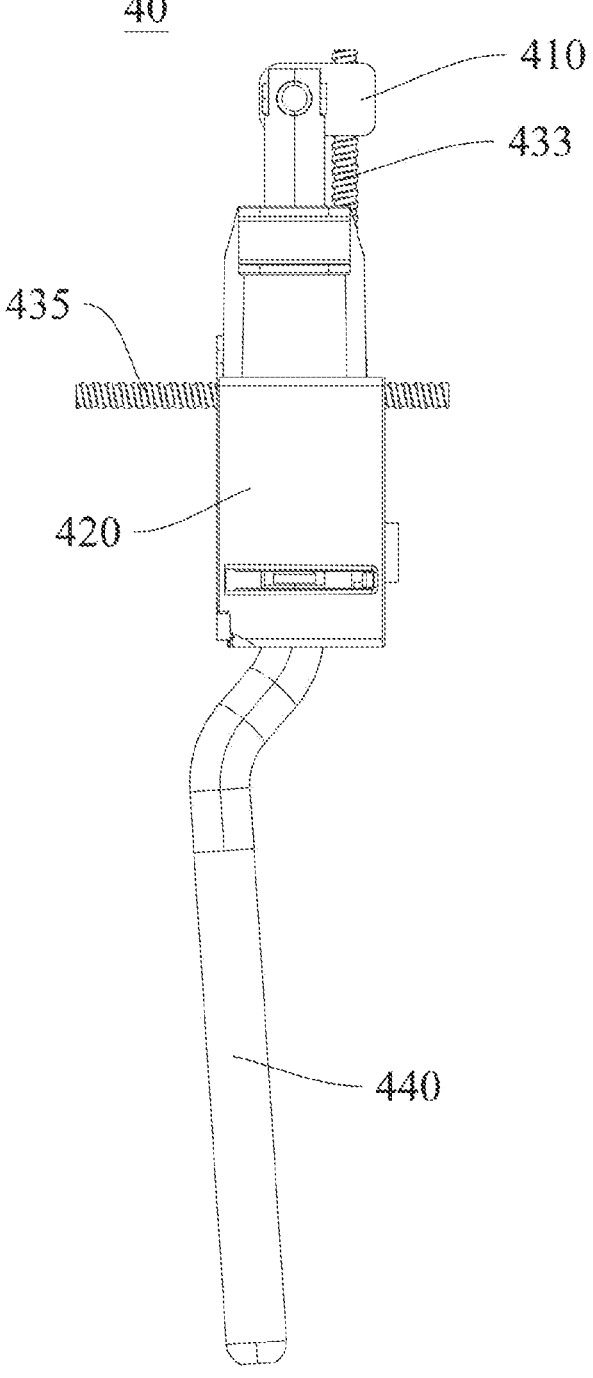
FIG. 11 is a left view of the adjustment assembly of the application.
Figure 12:
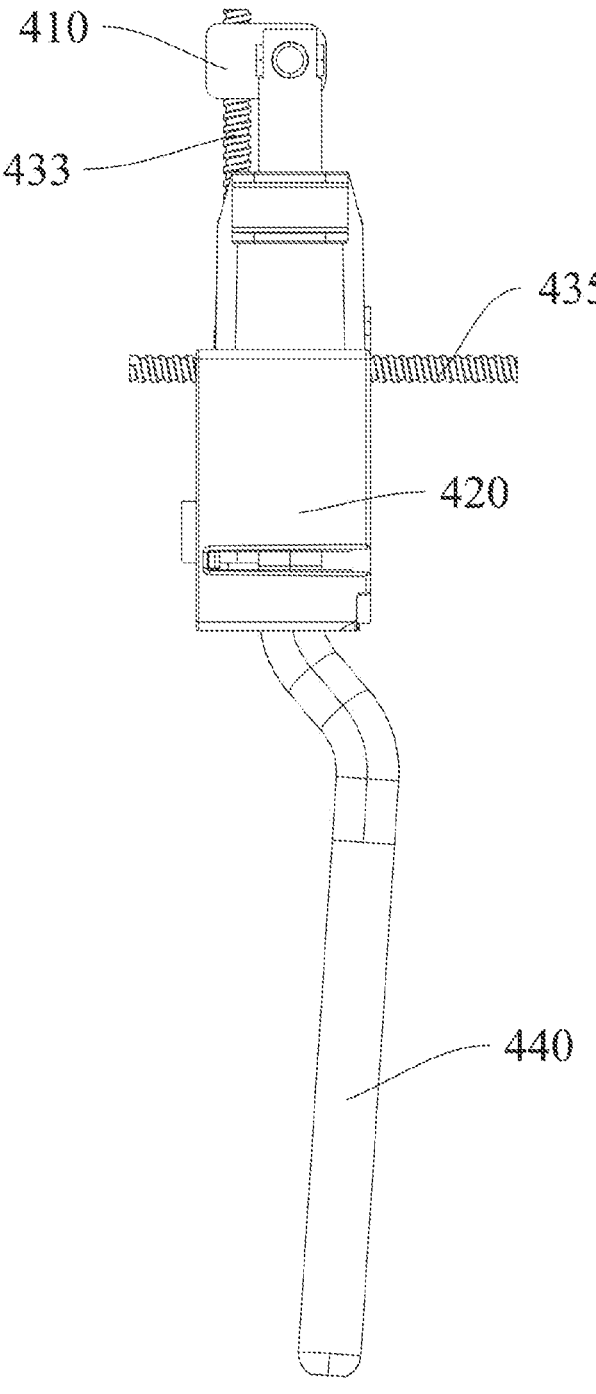
FIG. 12 is a right view of the adjustment assembly of the application.
Figure 13:
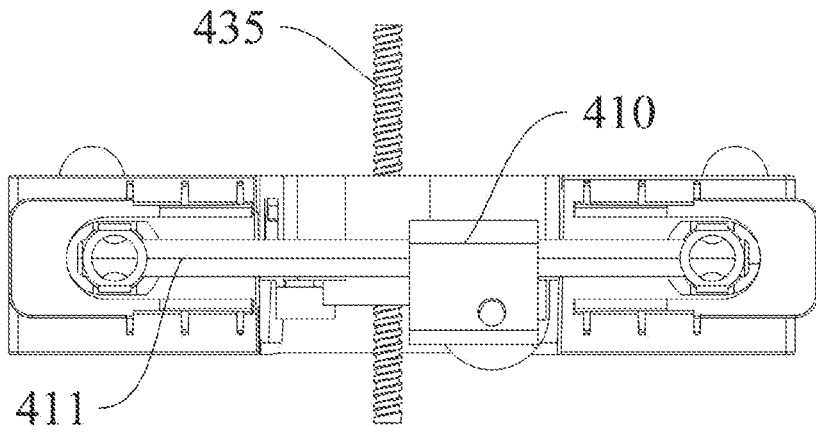
FIG. 13 is a top view of the adjustment assembly of the application.
Figure 14:
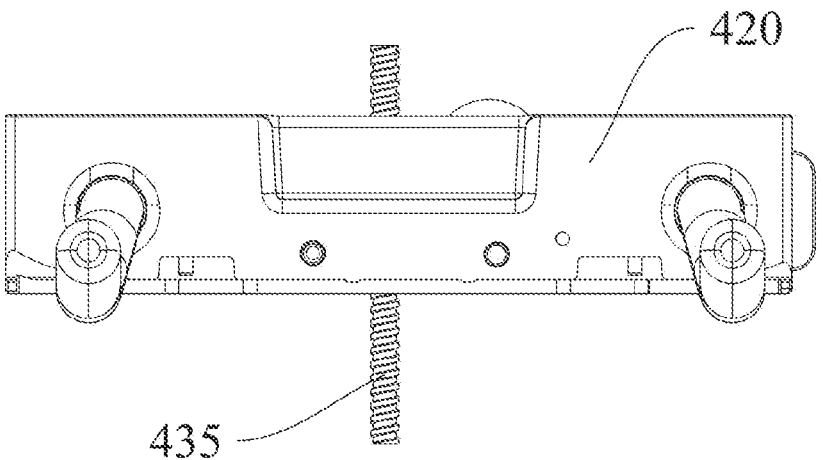
FIG. 14 is a bottom view of the adjustment assembly of the application.
Figures 16, 17, 18, 19, 20:
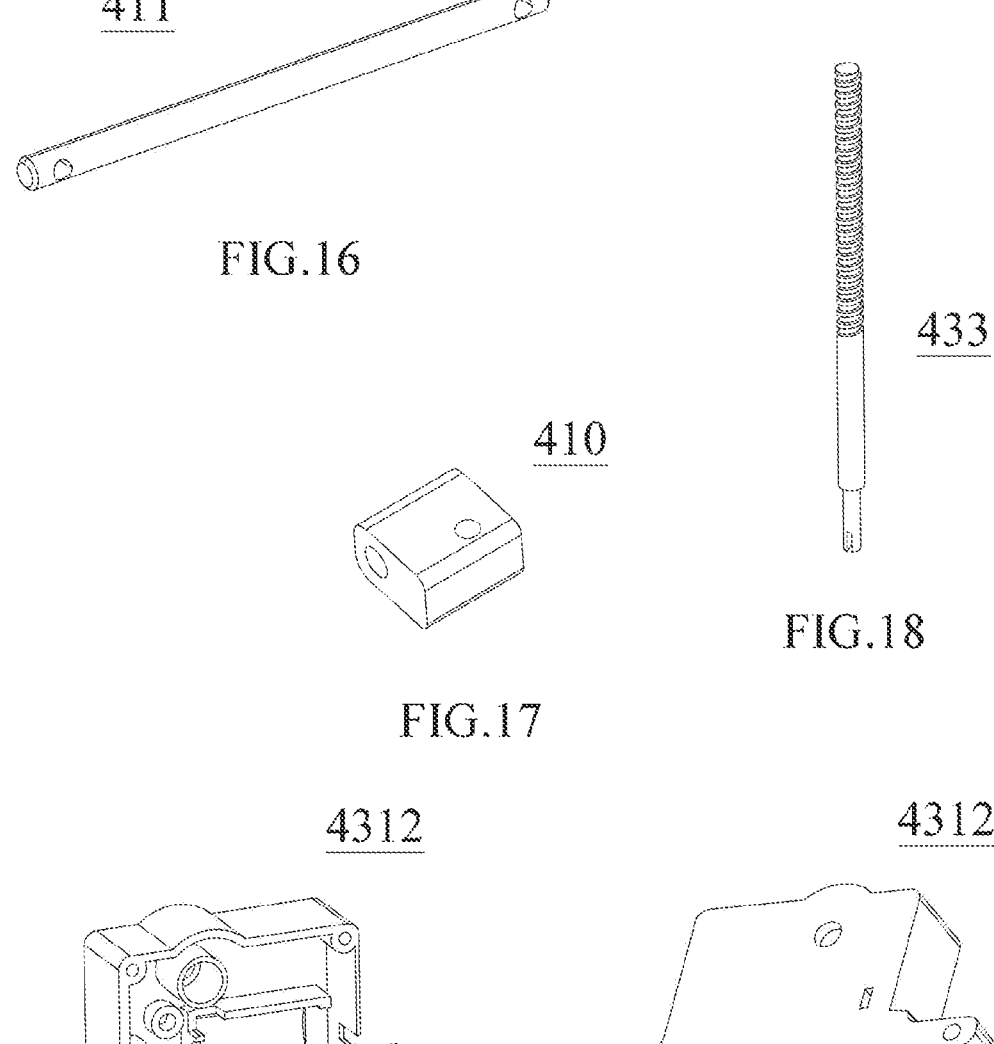
FIG. 16 is a perspective view of a fixing rod of the adjustment assembly of the application.
FIG. 17 is a perspective view of a fixing member of the adjustment assembly of the application.
FIG. 18 is a perspective view of a first screw of the adjustment assembly of the application.
FIG. 19 is a perspective view of a driving portion rear casing of the adjustment assembly of the application.
FIG. 20 is a perspective view of the driving portion rear casing of the adjustment assembly of the application from another angle of view.
Figures 25, 26, 27, 28, 29, 30, 31, 32:
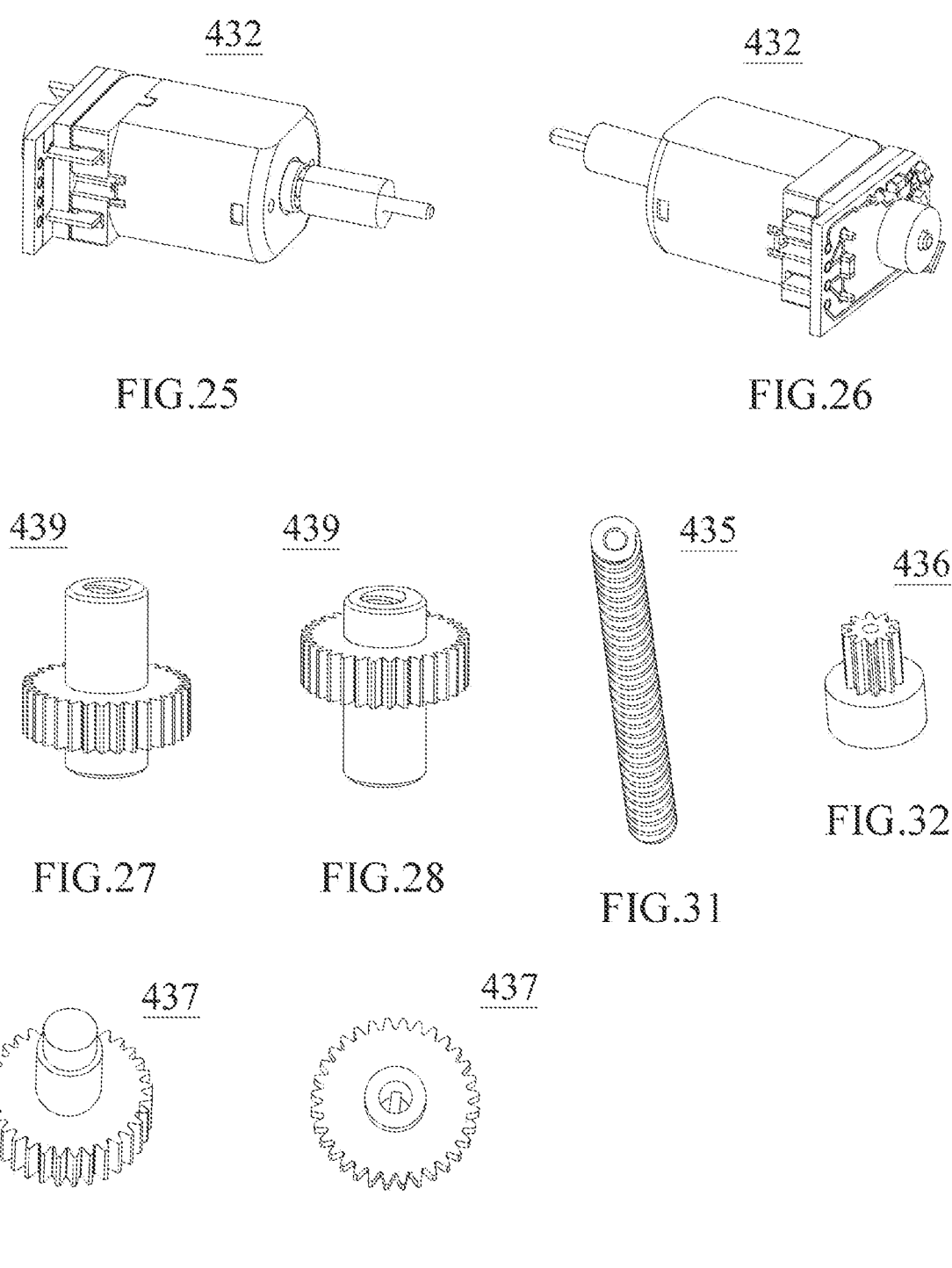
FIG. 25 is a perspective view of a first motor of the adjustment assembly of the application.
FIG. 26 is a perspective view of the first motor of the adjustment assembly of the application from another angle of view.
FIG. 27 is a perspective view of a first gear of the adjustment assembly of the application.
FIG. 28 is a perspective view of the first gear of the adjustment assembly of the application from another angle of view.
FIG. 29 is a perspective view of the first gear of the adjustment assembly of the application from another angle of view.
FIG. 30 is a perspective view of the first gear of the adjustment assembly of the application from another angle of view.
FIG. 31 is a perspective view of a second screw of the adjustment assembly of the application.
FIG. 32 is a perspective view of the second gear of the adjustment assembly of the application.
Figures 33, 34, 35:
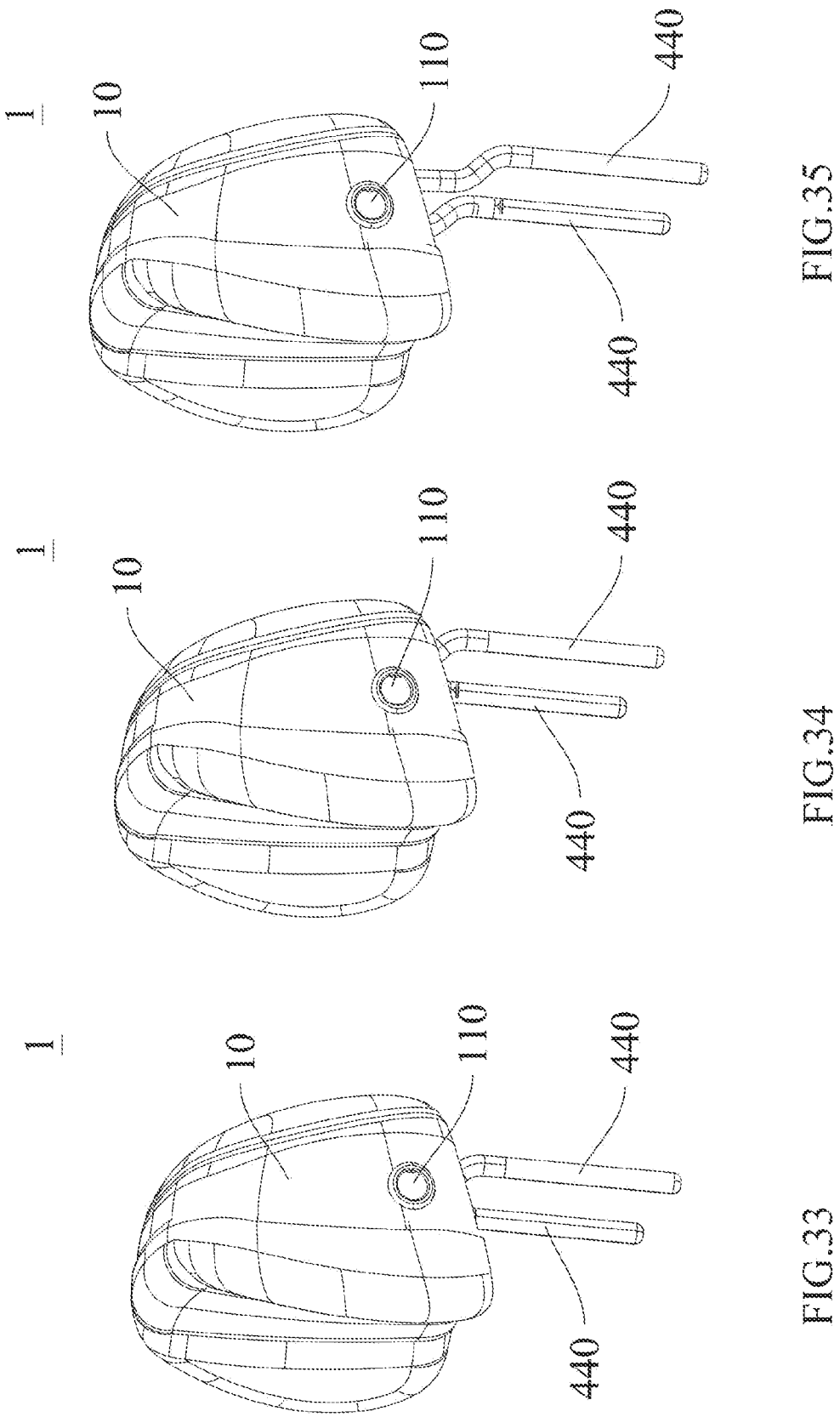
FIG. 33 is a perspective view of the headrest of the application, wherein the headrest is in a retracted position.
FIG. 34 is a perspective view of the headrest of the application, wherein the headrest is in an intermediate position.
FIG. 35 is a perspective view of the headrest of the application, wherein the headrest is in a deployed position.
Figures 36, 37, 38:
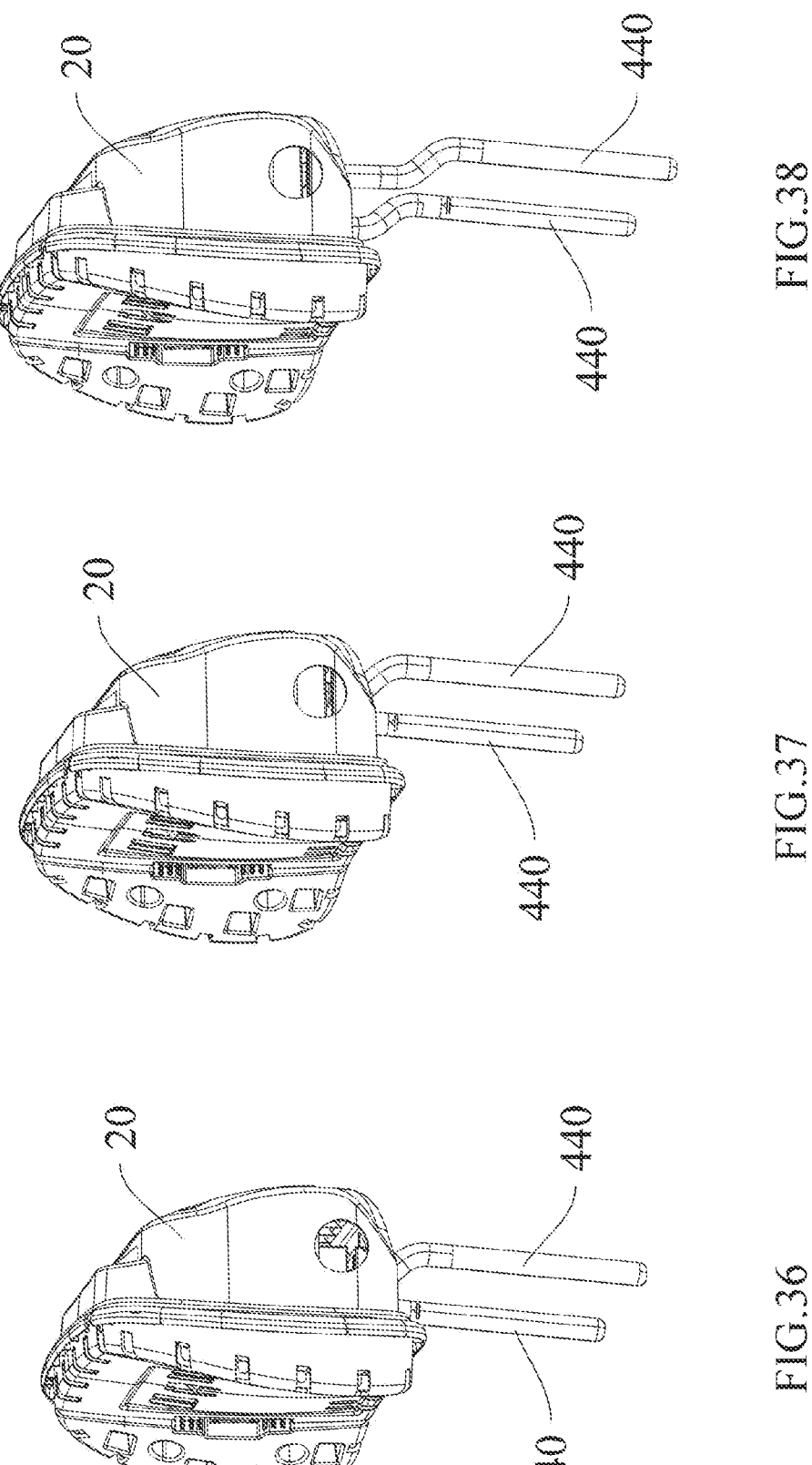
FIG. 36 is a perspective view of the headrest of the application, wherein the outer shell of the headrest is removed and the headrest is in the retracted position.
FIG. 37 is a perspective view of the headrest of the application, wherein the outer shell of the headrest is removed and the headrest is in the intermediate position.
FIG. 38 is a perspective view of the headrest of the application, wherein the outer shell of the headrest is removed and the headrest is in the deployed position.
Figures 39, 40, 41:
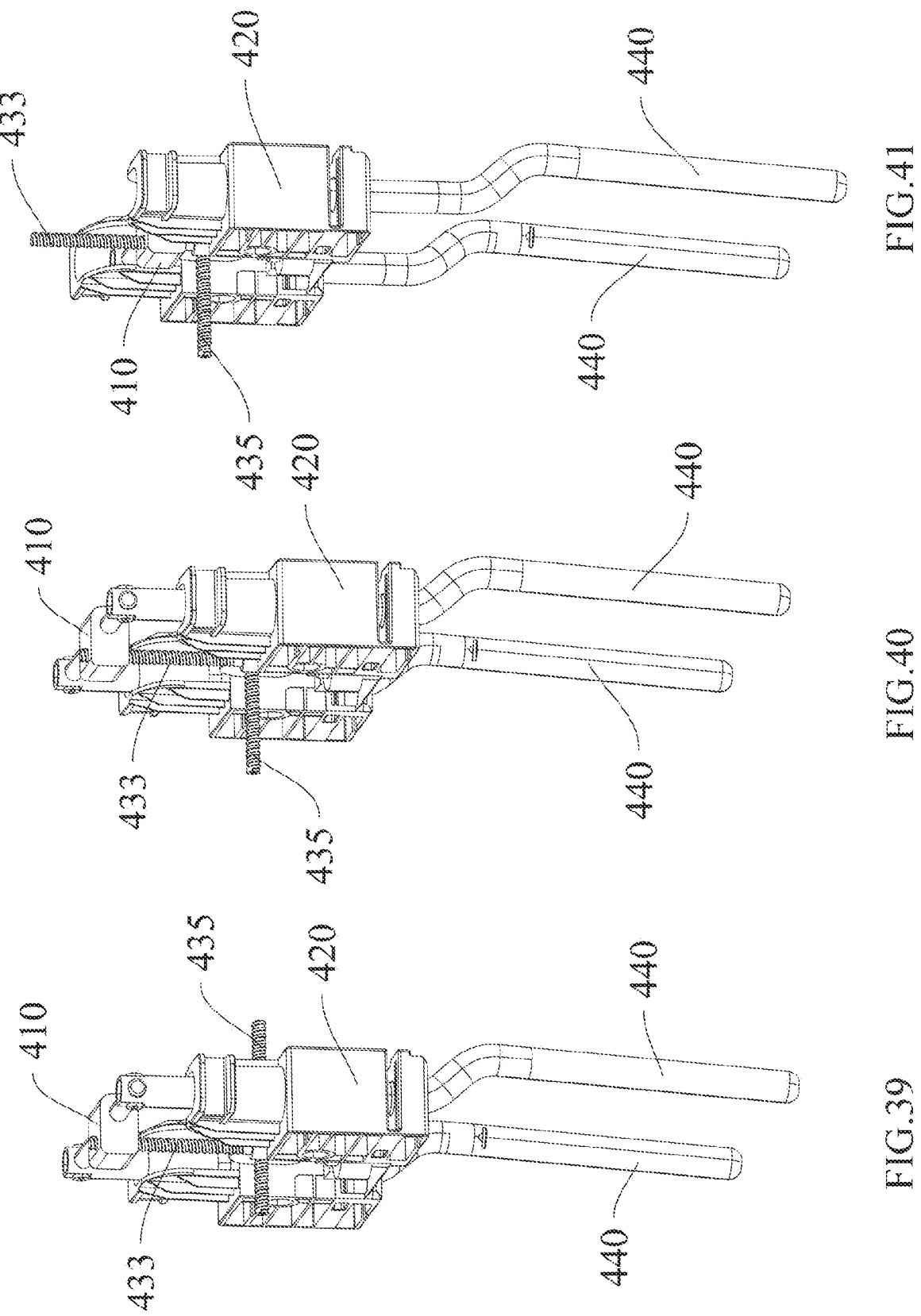
FIG. 39 is a perspective view of the adjustment assembly of the application, when the outer shell of the headrest is in the lowest position.
FIG. 40 is a perspective view of the adjustment assembly of the application, when the outer shell of the headrest is in the lowest position and the foremost position.
FIG. 41 is a perspective view of the adjustment assembly of the application, when the outer shell of the headrest is in the highest position and the foremost position.
Figure 43:
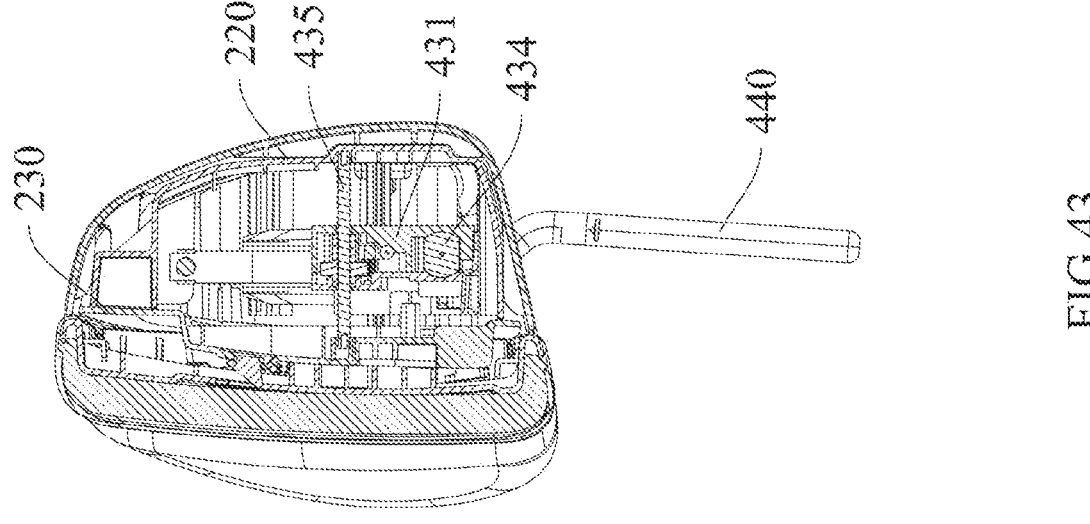
FIG. 43 is a cross-sectional view taken along line A-A in FIG. 42.
Figure 42:
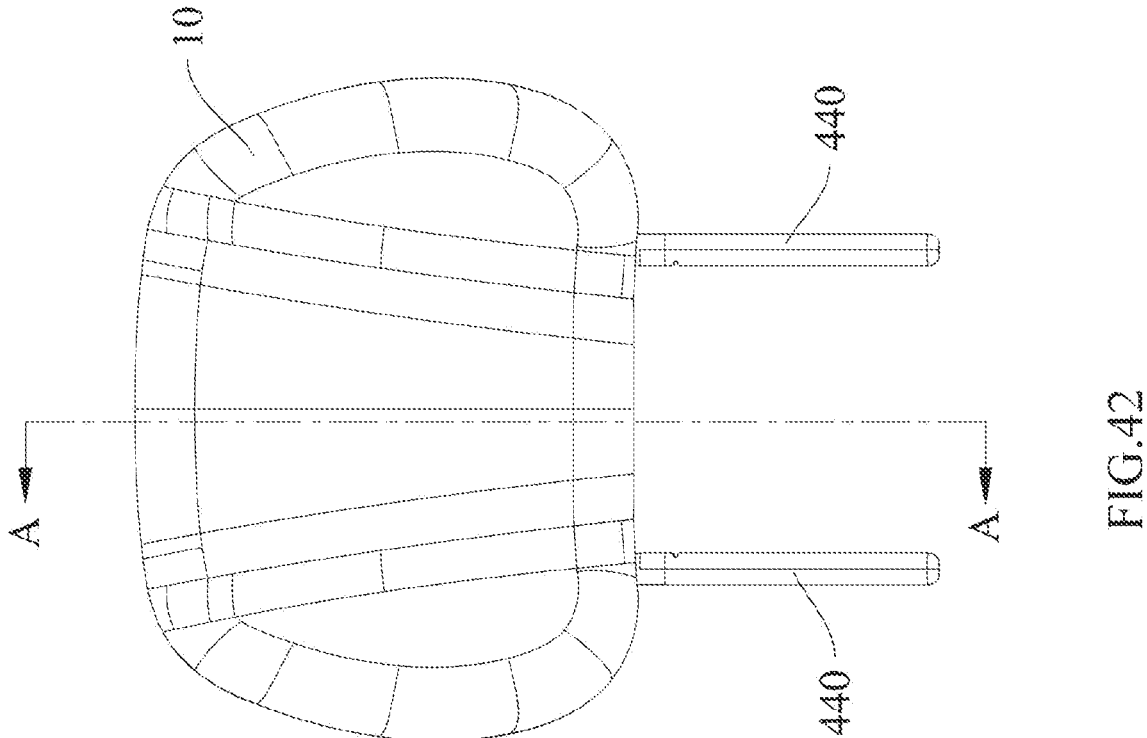
FIG. 42 is a front view of the headrest of the application, wherein the outer shell of the headrest is in the lowest position.
Figures 44, 45:
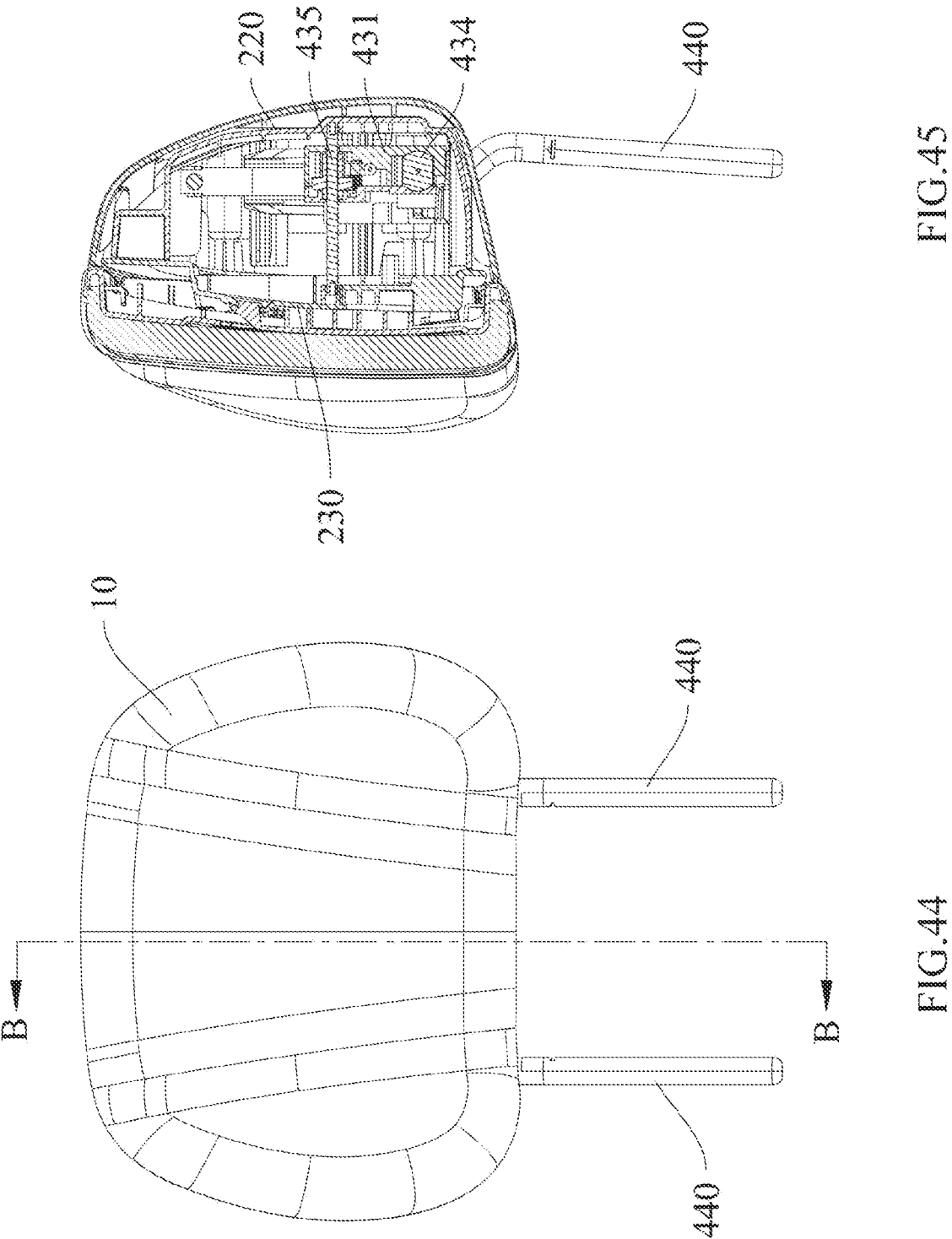
FIG. 44 is a front view of the headrest of the application, wherein the outer shell of the headrest is in the lowest position and the foremost position.
FIG. 45 is a cross-sectional view taken along line B-B in FIG. 44.
Figure 47:
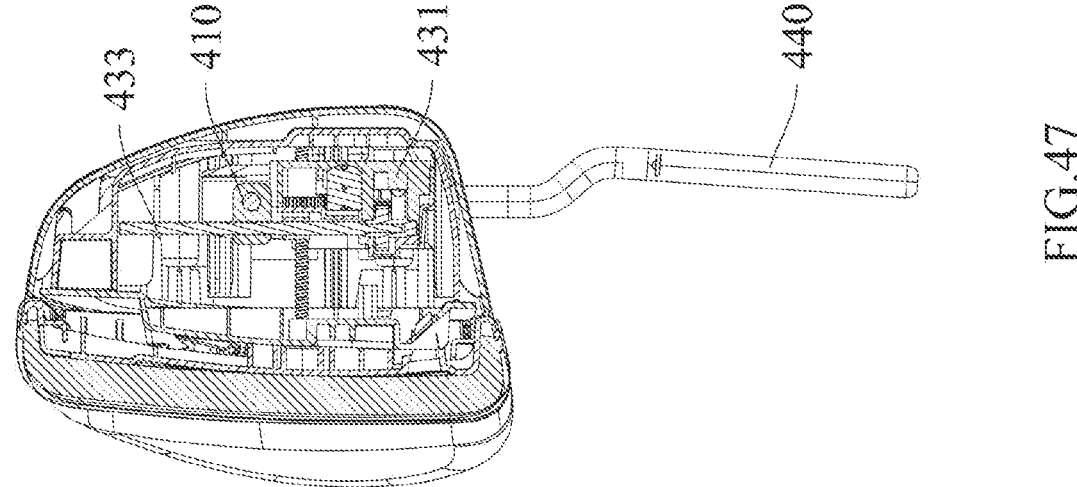
FIG. 47 is a cross-sectional view taken along line C-C in FIG. 46.
Figure 46:
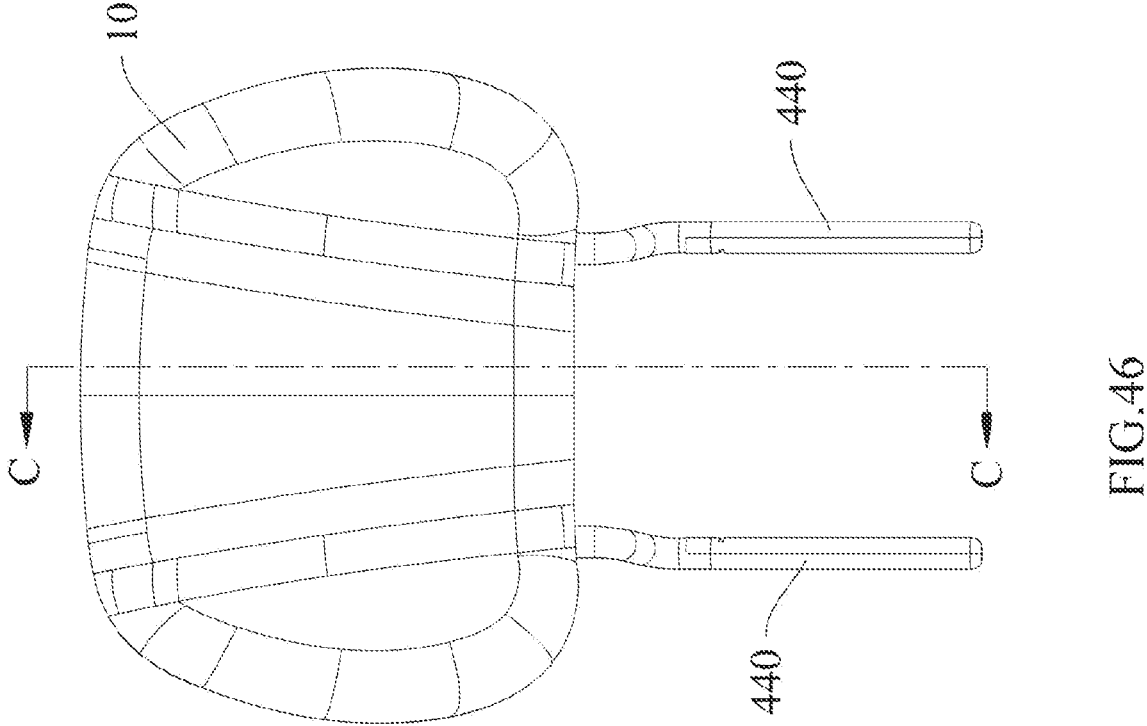
FIG. 46 is a front view of the headrest of the application, wherein the outer shell of the headrest is in the highest position and the foremost position.
Figures 48, 49:
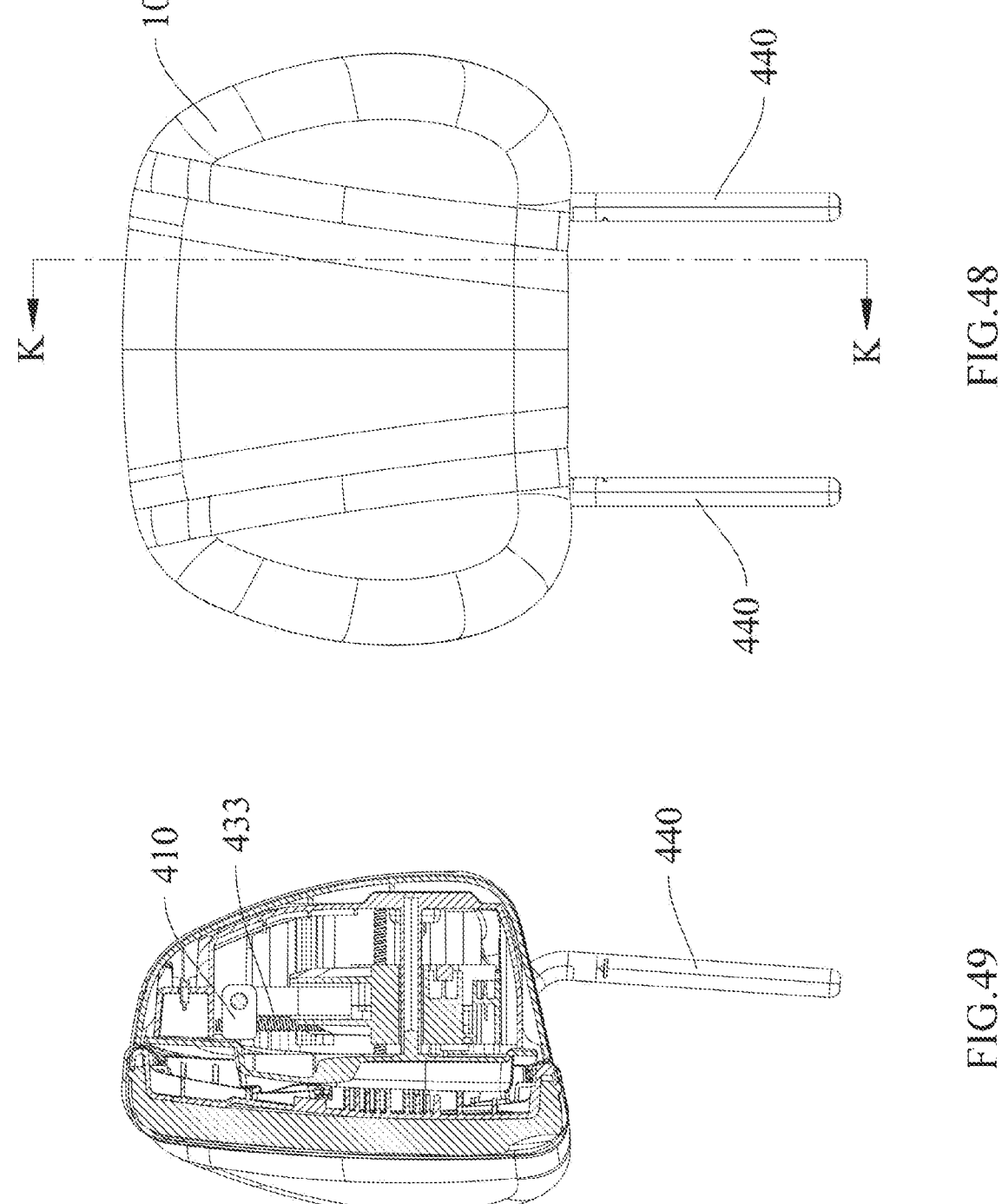
FIG. 48 is a front view of the headrest of the application, wherein the outer shell of the headrest is in the lowest position and the rearmost position.
FIG. 49 is a cross-sectional view taken along line K-K in FIG. 48.
Figures 50, 51:
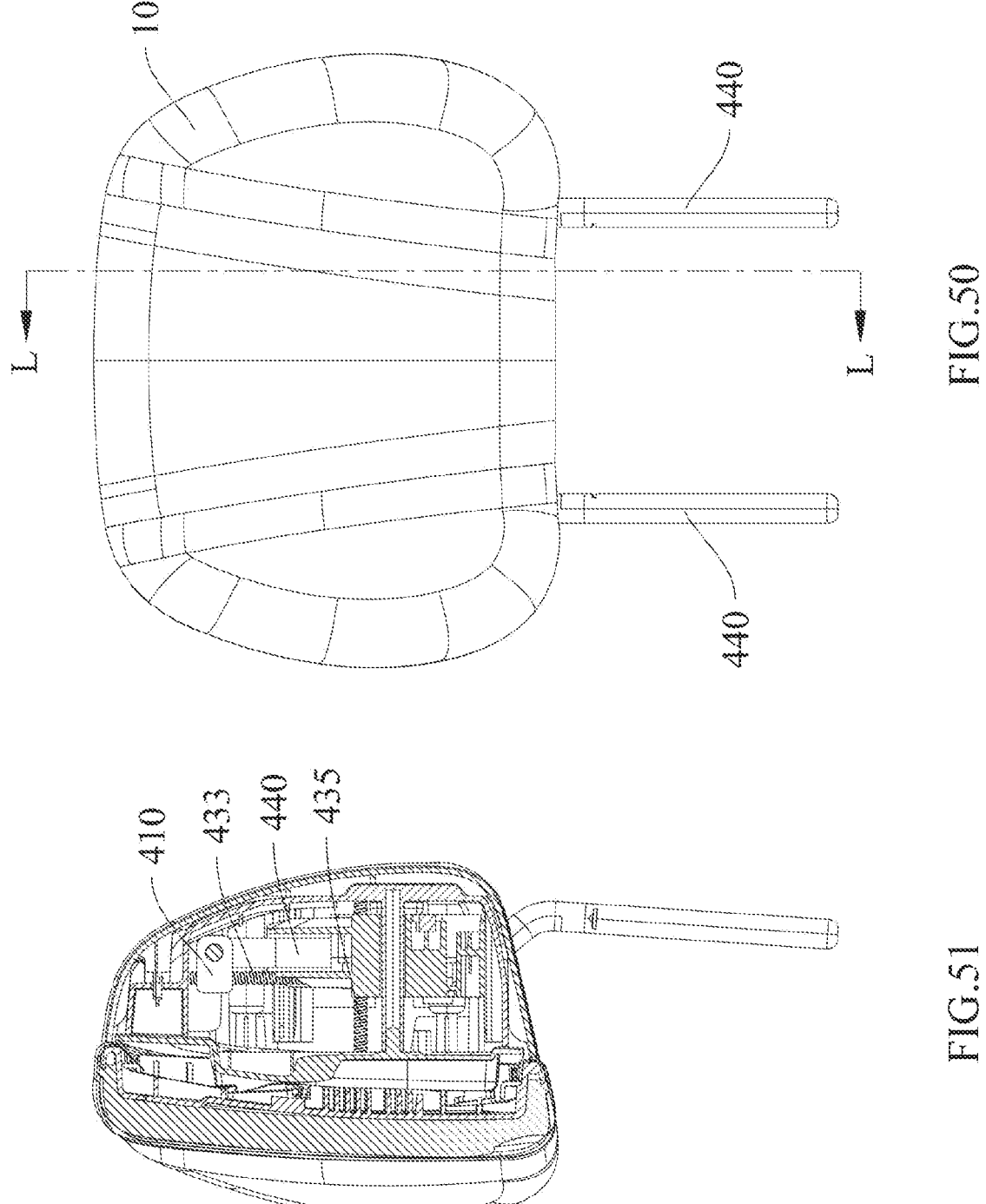
FIG. 50 is a front view of the headrest of the application, wherein the outer shell of the headrest is in the lowest position and the foremost position.
FIG. 51 is a cross-sectional view taken along line L-L in FIG. 50.
Figures 52, 53:
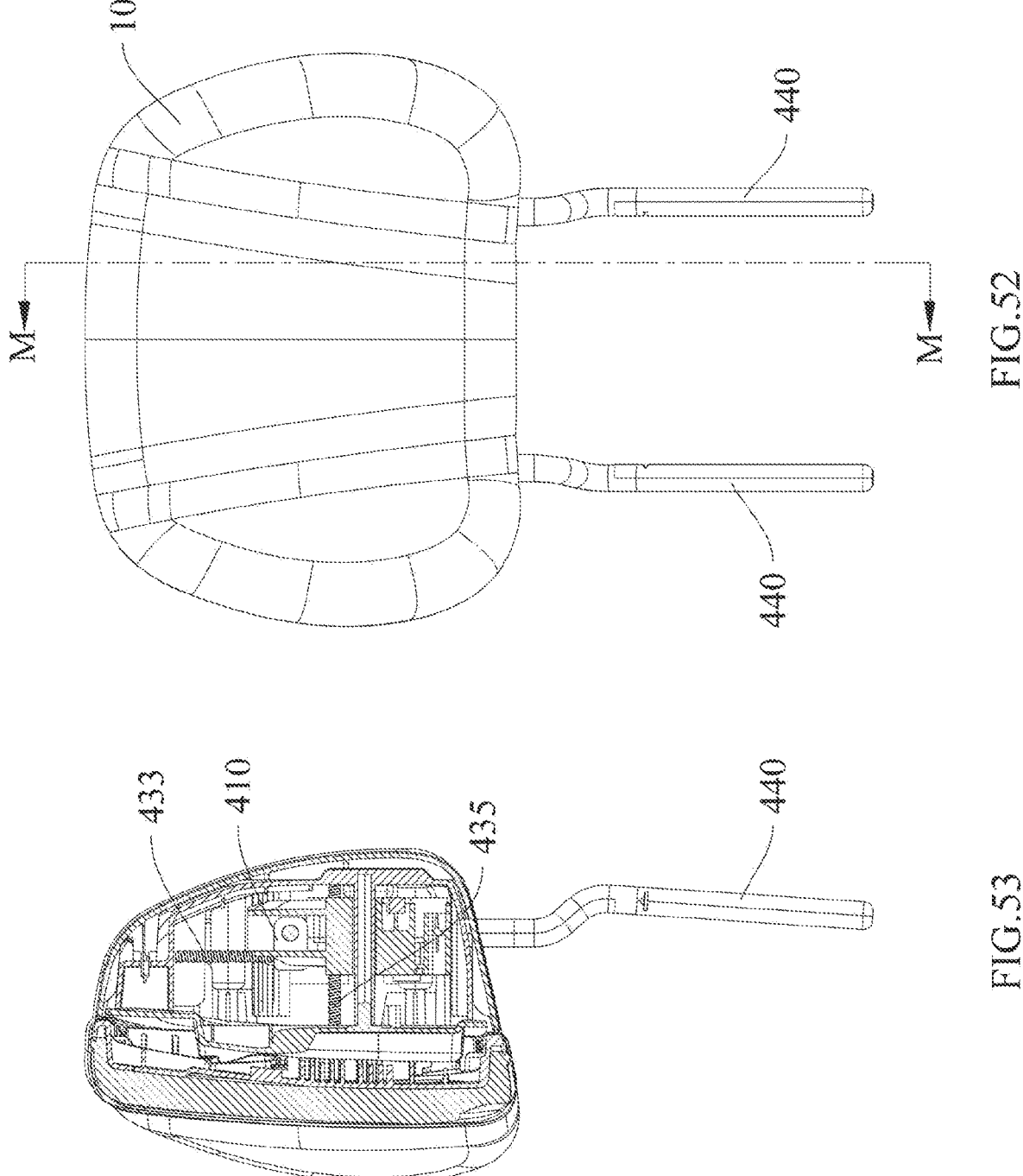
FIG. 52 is a front view of the headrest of the application, wherein the outer shell of the headrest is in the highest position and the foremost position.
FIG. 53 is a cross-sectional view taken along line M-M in FIG. 52.

The second screw 435 may pass through the driving portion casing 431 in a front-rear direction (i.e., the left-right direction in FIG. 11). The first screw 433 may extend in an up-down direction (i.e., the up-down direction in FIG. 11). That is, the first screw 433 may be perpendicular to the second screw 435. Referring to FIGS. 18 and 31, the first screw 433 may be threaded only on an up portion, and the second screw 435 may be threaded entirely, but the application is not limited thereto.

The adjustment assembly 40 may also include a slider 420. The slider 420 is slidably disposed on the guiding rods 440. The driving portion 430 may be fixed to the slider 420.

Figures 21, 22, 23, 24:
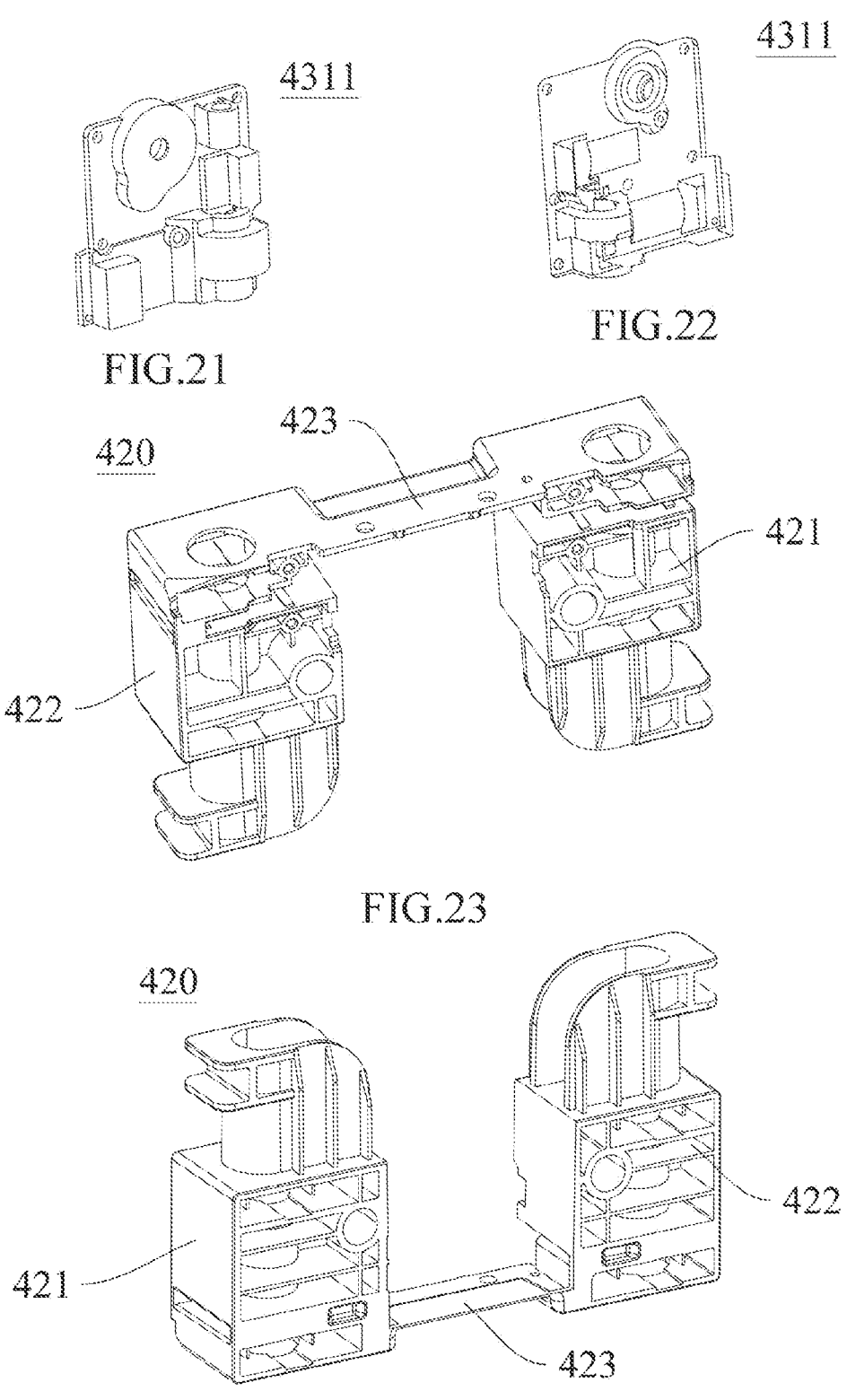
FIG. 21 is a perspective view of a driving portion front casing of the adjustment assembly of the application.
FIG. 22 is a perspective view of the driving portion front casing of the adjustment assembly of the application from another angle of view.
FIG. 23 is a perspective view of a slider of the adjustment assembly of the application.
FIG. 24 is a perspective view of the slider of the adjustment assembly of the application from another angle of view.

Referring to FIGS. 23-24, the slider 420 may include a first sliding portion 421, a second sliding portion 422, and a connecting portion 423 connecting the first sliding portion 421 and the second sliding portion 422. The first sliding portion 421 and the second sliding portion 422 are respectively slidably disposed on two guiding rods 440. The driving portion 430 is fixed to the slider 420 between the first sliding portion 421 and the second sliding portion 422. In this way, when the slider 420 slides along the two guiding rods 440, the driving portion 430 moves together with the slider 420 in respect to the two guiding rods 440. The driving portion 430 may be centrally arranged in a direction perpendicular to a sliding direction of the slider 420. In other words, the driving portion 430 may be arranged as centrally located on the adjustment assembly 40 in a third direction (the left-right direction of the adjustment assembly 40, see FIGS. 9 and 10) that is perpendicular to both the first direction and the second direction. The slider 420 is fixedly connected to the inner shell 20. Therefore, when the slider 420 slides along the two guiding rods 440, the outer shell 10 and the inner shell 20 move together with the slider 420 in respect to the two guiding rods 440. The bent portion 441 may form an angle in respect to other portions of the guiding rods 440 to limit a movement range of the slider 420.

Referring to FIGS. 33-41, the first motor 432 can drive the first screw 433 to rotate. Specifically, rotation of the output shaft of the first motor 432 drives the first gear 436 to rotate, and rotation of the first gear 436 in turn drives the other first gear 437 sleeved on the first screw 433 to rotate. When the first screw 433 rotates, the first screw 433 moves upward or downward in respect to the fixing member 410. At this time, since the first screw 433 is fixed to the driving portion casing 431, the outer shell 10, the inner shell 20, the slider 420, and the driving portion 430 move upward or downward together with the first screw 433 in respect to the fixing member 410. Lower portions of the guiding rods 440, for example, may be fixed to the backrest of the car seat. Therefore, moving upward and downward of the outer shell 10 of the headrest 1 in respect to the seat can be realized, thereby adjusting usage height of the headrest 1 (see FIGS. 42-47).

Referring to FIGS. 39-41 and 48-51, the second motor 434 can drive the second screw 435 to rotate. Specifically, rotation of the output shaft of the second motor 434 brings the second gear 438 to rotate, and rotation of the second gear 438 in turn brings the other second gear 439 sleeved on the second screw 435 to rotate. Both ends of the second screw 435 respectively abut against the inner shell front portion 230 and the inner shell rear portion 220. When the second screw 435 rotates, the second screw 435 moves forward or backward in respect to the second motor 434 and the driving portion casing 431. At this time, since both ends of the second screw 435 respectively abut the inner shell front portion 230 and the inner shell rear portion 220, the outer shell 10 and the inner shell 20 move forward or backward together in respect to the driving portion casing 431. Since the guiding rods 440 do not move in the front-rear direction in respect to the driving portion casing 431, the outer shell 10 of the headrest 1 can move backward and forward in respect to the seat, thereby adjusting a front-rear position of the headrest 1.

The outer shell 10 of the headrest 1 can move up and down within a range of, for example, 50 mm, and move backward and forward within a range of, for example, 30 mm, but the application is not limited to the movement distance of the outer shell 10. The time taken for the outer shell 10 to move the above-mentioned distance is, for example, about 7 seconds, but the application is not limited to the movement time of the outer shell 10. The load when the outer shell 10 of the headrest 1 moves is, for example, 35 N, but the application is not limited to the value of the load.

The outer shell 10 of the headrest 1 may be locked at any position during movement. Alternatively, the outer shell 10 of the headrest 1 may be locked at specific positions during movement. At least one of the first motor 432 and the second motor 434 may include a Hall sensor for position memory.

The headrest 1 in this embodiment can move up and down as well as backward and forward, such that the position of the headrest can be flexibly adjusted, which is convenient for passengers with different statures and sitting postures. More-over, the headrest 1 is easy to be operated without manual adjustment.

In another embodiment, the headrest 1 may move can only move up and down, but cannot move leftward and rightward. That is, the second motor 434, the second screw 435, and the second gears 438, 439 in the previous embodiment may be omitted.

In another embodiment, the outer shell 10 of the headrest 1 can move up and down within a range of, for example, 40 mm, but the application is not limited to the moving distance of the outer shell 10. The time taken for the outer shell 10 to move the above-mentioned distance is, for example, about 5 seconds, but the application is not limited to the movement time of the outer shell 10. The load when the outer shell 10 of the headrest 1 moves is, for example, 25 N, but the application is not limited to the value of the load.

In another embodiment, the outer shell 10 of the headrest 1 may be locked at any position during movement. Alternatively, the outer shell 10 of the headrest 1 may be locked at specific positions during movement. The first motor 432 may include a Hall sensor for position memory.

The headrest 1 in this embodiment can move up and down, such that the position of the headrest can be flexibly adjusted, which is convenient for passengers with different statures and sitting postures. Moreover, the headrest 1 is easy to be operated without manual adjustment. The headrest 1 in this embodiment has a simpler structure, thereby saving costs.

After considering the specification and practice of the application disclosed herein, those skilled in the art will easily think of other embodiments of the application. The application is intended to cover any modification, use or adaptation of the application any modification, use or adaptation of the application that follows the general principles of this disclosure and includes common knowledge in the technical field not disclosed in this application or conventional technical means. The specification and examples shall be regarded as exemplary only, and the true scope and spirit of the application are indicated by the claims of the application.

Although the application has been described with reference to typical embodiments, the terms used are terms of description and illustration rather than limitation. Since the application can be embodied in various forms without departing from the spirit and essence of the application, it should be understood, the above-described embodiments are not limited to any foregoing details, but should be interpreted as broadly as possible within the scope defined in the claims. Therefore, all changes falling within the scope of claims or their equivalents should be covered by claims.

REFERENCE SIGNS LIST

1 Headrest
  10 Outer Shell
    110 Wring Hole
    111 Outer Shell Front Portion
    112 Outer Shell Rear Portion
  20 Inner Shell
    210 Deformable Shell Body
    220 Inner Shell Rear Portion
    230 Inner Shell Front Portion
  40 Adjustment Assembly
    410 Fixing Member
      411 Fixing Rod
    420 Slider

421 First Sliding Portion
    422 Second Sliding Portion
    423 Connecting Portion
    430 Driving Portion
      431 Driving Portion Casing
        4311 Driving Portion Front Casing
        4312 Driving Portion Rear Casing
      432 First Motor
      433 First Screw
      434 Second Motor
      435 Second Screw
      436 Gear
      437 Gear
      438 Gear
      439 Gear
    440 Guiding Rod
      441 Bent Portion
      442 Positioning Portion

What is claimed is:

1. An adjustment assembly, comprising:
a guiding rod;
a fixing member, fixed to an end of the guiding rod;
a driving portion, movably connected to the fixing member; and
a first screw, engaged to the fixing member with threads, and the driving portion is connected to the fixing member by the first screw,
wherein the driving portion includes a first motor, and the first motor is used to drive the driving portion to linearly move in respect to the fixing member along a direction close to or away from the fixing member;
wherein the driving portion further includes a first gear and a driving portion casing, the first motor and the first gear are arranged in the driving portion casing, and the first motor is engaged with the first screw by the first gear;
wherein the adjustment assembly further comprises a second screw, the driving portion further includes a second motor and a second gear, the second motor and the second gear are arranged in the driving portion casing, the second motor is engaged with the second screw by the second gear, and the second motor is used to drive the second screw to linearly move along an axis direction of the second screw; and
wherein the first motor is located below the second motor, and an output shaft of the first motor is parallel to an output shaft of the second motor.

2. The adjustment assembly according to claim 1, wherein the adjustment assembly comprises two guiding rods extending parallel to each other, the fixing member includes a fixing rod, and the fixing member is fixed between the two guiding rods by the fixing rod.

3. The adjustment assembly according to claim 1, wherein the adjustment assembly further comprises a slider slidably disposed on the guiding rod, the driving portion is fixed to the slider, and the driving portion is centrally arranged in a direction perpendicular to a sliding direction of the slider.

4. The adjustment assembly according to claim 2, wherein the adjustment assembly further comprises a slider, the slider includes a first sliding portion, a second sliding portion, and a connecting portion connecting the first sliding portion and the second sliding portion, the first sliding portion and the second sliding portion are respectively slidably disposed on the two guiding rods, and the driving portion is fixed to the slider between the first sliding portion and the second sliding portion.

5. The adjustment assembly according to claim 1, wherein the first gear and the second gear each includes at least two gears.

6. The adjustment assembly according to claim 1, wherein the first motor and the second motor respectively includes a Hall sensor for position memory.

7. The adjustment assembly according to claim 1, wherein the first screw is able to be locked in respect to the fixing member at any position of its movement, and the second screw is able to be locked in respect to the second motor at any position of its movement.

8. A headrest, comprising:

the adjustment assembly according to claim 1;

an outer shell, forming an appearance of the headrest; and an inner shell, disposed inside the outer shell and fixed to the outer shell, and surrounding at least a portion of the adjustment assembly, wherein the outer shell and the inner shell move together with the driving portion of the adjustment assembly.

9. The headrest according to claim 8, wherein the outer shell is provided with a wiring hole, and the wiring hole is used for passing of a wire harness.

10. A headrest, comprising:

the adjustment assembly according to claim 1;

an outer shell, forming an appearance of the headrest; and an inner shell, disposed inside the outer shell and fixed to the outer shell, and surrounding at least a portion of the adjustment assembly, wherein the outer shell and the inner shell move in a first direction together with a driving portion of the adjustment assembly, and the second screw abuts against the inner shell, such that the outer shell and the inner shell move in a second direction together with the second screw in respect to the driving portion casing.

11. The headrest according to claim 10, wherein the first direction is perpendicular to the second direction.

12. The headrest according to claim 10, wherein the outer shell is provided with a wiring hole, and the wiring hole is used for passing of a wire harness.

13. An adjustment assembly, comprising:

a guiding rod;

a fixing member, fixed to an end of the guiding rod;

a driving portion, movably connected to the fixing member;

a first screw, engaged to the fixing member with threads, and the driving portion is connected to the fixing member by the first screw;

wherein the driving portion includes a first motor, and the first motor is used to drive the driving portion to linearly move in respect to the fixing member along a direction close to or away from the fixing member;

wherein the adjustment assembly further comprises a slider slidably disposed on the guiding rod, the driving portion is fixed to the slider, and the driving portion is centrally arranged in a direction perpendicular to a sliding direction of the slider; and wherein the guiding rod includes a bent portion and a positioning portion, the bent portion forms an angle in respect to other portions of the guiding rod to limit a movement range of the slider, the positioning portion is formed as a plurality of grooves extending along a length of the guiding rod for providing resistance to a movement of the slider at a plurality of positions.

14. An adjustment assembly, comprising:

a guiding rod;

a fixing member, fixed to an end of the guiding rod;

a driving portion, movably connected to the fixing member;

a first screw, engaged to the fixing member with threads, and the driving portion is connected to the fixing member by the first screw;

wherein the driving portion includes a first motor, and the first motor is used to drive the driving portion to linearly move in respect to the fixing member along a direction close to or away from the fixing member;

wherein the adjustment assembly comprises two guiding rods extending parallel to each other, the fixing member includes a fixing rod, and the fixing member is fixed between the two guiding rods by the fixing rod;

wherein the adjustment assembly further comprises a slider, the slider includes a first sliding portion, a second sliding portion, and a connecting portion connecting the first sliding portion and the second sliding portion, the first sliding portion and the second sliding portion are respectively slidably disposed on the two guiding rods, and the driving portion is fixed to the slider between the first sliding portion and the second sliding portion; and wherein the guiding rod includes a bent portion and a positioning portion, the bent portion forms an angle in respect to other portions of the guiding rod to limit a movement range of the slider, the positioning portion is formed as a plurality of grooves extending along a length of the guiding rod for providing resistance to a movement of the slider at a plurality of positions.

* * * * *